(12) United States Patent
Boulard

(10) Patent No.: US 12,455,921 B2
(45) Date of Patent: Oct. 28, 2025

(54) MOOD-ALTERING MUSIC RECOMMENDATION SYSTEM BASED ON EMOTIONAL REACTIONS TO ENTERTAINMENT

(71) Applicant: Jesse Boulard, Westerville, OH (US)

(72) Inventor: Jesse Boulard, Westerville, OH (US)

( * ) Notice: Subject to any disclaimer, the term of this patent is extended or adjusted under 35 U.S.C. 154(b) by 313 days.

(21) Appl. No.: 18/111,282

(22) Filed: Feb. 17, 2023

(65) Prior Publication Data

US 2023/0259551 A1 Aug. 17, 2023

Related U.S. Application Data

(60) Provisional application No. 63/311,082, filed on Feb. 17, 2022.

(51) Int. Cl.
*G06F 16/635* (2019.01)
*G06F 16/901* (2019.01)

(52) U.S. Cl.
CPC .......... *G06F 16/636* (2019.01); *G06F 16/637* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 8,732,101 B1 | 5/2014 | Wilson et al. | |
| 10,156,969 B2 | 12/2018 | Sirpal et al. | |
| 11,176,484 B1 | 11/2021 | Dorner | |
| 11,375,256 B1 * | 6/2022 | Dorner | G06N 3/04 |
| 2009/0063414 A1 * | 3/2009 | White | G06F 3/04817 |
| 2009/0248599 A1 | 10/2009 | HillHueter et al. | |
| 2013/0123583 A1 | 5/2013 | Hill | |
| 2015/0058097 A1 | 2/2015 | Alturkstani | |
| 2015/0186383 A1 | 7/2015 | Pinckney et al. | |
| 2020/0012651 A1 * | 1/2020 | Matsuda | G06F 16/435 |

* cited by examiner

*Primary Examiner* — Walter F Briney, III
(74) *Attorney, Agent, or Firm* — Standley Law Group LLP; Bryan P. Finneran; Jeffrey C. Norris

(57) ABSTRACT

A system and its corresponding method are provided for recommending media based on emotion-related feedback from a user. In one example of the system and its corresponding method, songs are assigned to a queue according to objective criteria for achieving desired emotions with the user. Songs may also be assigned to the queue based on documented similarities between various user personality profiles.

20 Claims, 19 Drawing Sheets

Change 28 in average song reaction profile 18a

Mood Hypothesis Adjustment Framework 78

| Before 16a (iii) listen | | After 16a (iii) listen | |
|---|---|---|---|
| Emotion | Probability | Emotion | Probability |
| Sad | 60% | Sad  75 | 70% |
| Happy | 10% | Happy | 10% |
| Elated | 0% | Elated | 0% |
| Heartbroken | 30% | Heartbroken  76 | 90% |
| Angry | 10% | Angry | 10% |
| Regretful | 50% | Regretful  77 | 30% |

FIG. 4

| Users (94) | | | |
|---|---|---|---|
| ID | Religion | Interests | Pictures |
| User A | None | <a list> | <images> |
| User B | Catholic | <a list> | <images> |
| User C | Muslim | <a list> | <images> |

FIG. 7

| Personality Profiles (96) | | | | | |
|---|---|---|---|---|---|
| ID | Melancholy Level | Upbeat Level | Passionate Level | Song Profiles | User ID |
| User A PP | 9.0 | 2.5 | 8.5 | Song Profiles 18 for User A | User A |
| User B PP | 3.0 | 7.8 | 4.3 | <a list> | User B |
| User C PP | 8.3 | 3.0 | 7.9 | <a list> | User C |

FIG. 8

| Song Profiles (18) | | | | |
|---|---|---|---|---|
| ID | Intensity Peaks | Song | User ID | Emotional Reaction Tracks |
| User A SP1 | Intensity Peaks in Song Profile User A SP1 | Song A | User A | Emotional Reaction Tracks for User A SP1 |
| User A SP2 | Intensity Peaks in Song Profile User A SP2 | Song C | User A | <a list> |
| User A SP3 | Intensity Peaks in Song Profile User A SP3 | Song D | User A | <a list> |
| User C SP1 | Intensity Peaks similar to Intensity Peaks in Song Profile User A SP1 | Song A | User C | <a list> |
| User C SP2 | Intensity Peaks similar to Intensity Peaks in Song Profile User A SP2 | Song B | User C | <a list> |
| User C SP3 | Intensity Peaks similar to Intensity Peaks in Song Profile User A SP3 | Song C | User C | <a list> |

FIG. 9

| Emotional Reaction Tracks (16) for User A SP1-3 | | | |
|---|---|---|---|
| ID | Intensity Peaks (32) | Song Profile ID | User ID |
| User A SP1 ERT1 | Intensity Peaks in Emotional Reaction Track User A SP1 ERT1 | User A SP1 | User A |
| User A SP1 ERT2 | Intensity Peaks in Emotional Reaction Track User A SP1 ERT2 | User A SP1 | User A |
| User A SP1 ERT3 | Intensity Peaks in Emotional Reaction Track User A SP1 ERT3 | User A SP1 | User A |
| User A SP2 ERT1 | Intensity Peaks in Emotional Reaction Track User A SP2 ERT1 | User A SP2 | User A |
| User A SP2 ERT2 | Intensity Peaks in Emotional Reaction Track User A SP2 ERT2 | User A SP2 | User A |
| User A SP2 ERT3 | Intensity Peaks in Emotional Reaction Track User A SP2 ERT3 | User A SP2 | User A |
| User A SP3 ERT1 | Intensity Peaks in Emotional Reaction Track User A SP3 ERT1 | User A SP3 | User A |
| User A SP3 ERT2 | Intensity Peaks in Emotional Reaction Track User A SP3 ERT2 | User A SP3 | User A |
| User A SP3 ERT3 | Intensity Peaks in Emotional Reaction Track User A SP3 ERT3 | User A SP3 | User A |

FIG. 10

| Intensity Peaks (32) in Song Profile (18) for User A SP1 | | | | |
|---|---|---|---|---|
| ID | Intensity Level | Emotion | Location in Time | Song Profile ID |
| User A SP1 IP1 | 6.77 | Melancholy | 0:02 - 0:10 | User A SP1 |
| User A SP1 IP2 | 6.07 | Passionate | 0:34 - 0:50 | User A SP1 |
| User A SP1 IP3 | 7.9 | Melancholy | 1:02 - 1:10 | User A SP1 |

FIG. 11

| Intensity Peaks (32) in Song Profile (18) for User A SP2 | | | | |
|---|---|---|---|---|
| ID | Intensity Level | Emotion | Location in Time | Song Profile ID |
| User A SP2 IP1 | 6.0 | Melancholy | 0:11 - 0:22 | User A SP2 |
| User A SP2 IP2 | 5.78 | Melancholy | 0:44 - 0:55 | User A SP2 |
| User A SP2 IP3 | 8.3 | Wistful | 1:23 - 1:34 | User A SP2 |

FIG. 12

| Intensity Peaks (32) in Song Profile (18) for User A SP3 | | | | |
|---|---|---|---|---|
| ID | Intensity Level | Emotion | Location in Time | Song Profile ID |
| User A SP3 IP1 | 1.0 | Upbeat | 0:03 - 0:11 | User A SP3 |
| User A SP3 IP2 | 2.0 | Upbeat | 0:20 - 0:40 | User A SP3 |
| User A SP3 IP3 | 2.3 | Upbeat | 0:57 - 1:24 | User A SP3 |

FIG. 13

| Intensity Peaks (32) in Emotional Reaction Track (16) User A SP1 ERT1 | | | | |
|---|---|---|---|---|
| ID | Intensity Level | Emotion | Location in Time | Song Profile ID |
| User A SP1 ERT1 IP1 | 8.0 | Melancholy | 0:02 - 0:10 | User A SP1 |
| User A SP1 ERT1 IP2 | 8.0 | Passionate | 0:34 - 0:50 | User A SP1 |
| User A SP1 ERT1 IP3 | 9.3 | Melancholy | 1:02 - 1:10 | User A SP1 |

FIG. 14

| Intensity Peaks (32) in Emotional Reaction Track (16) User A SP2 ERT2 | | | | |
|---|---|---|---|---|
| ID | Intensity Level | Emotion | Location in Time | Song Profile ID |
| User A SP2 ERT2 IP1 | 6.0 | Melancholy | 0:02 - 0:10 | User A SP2 |
| User A SP2 ERT2 IP2 | 5.0 | Passionate | 0:34 - 0:50 | User A SP2 |
| User A SP2 ERT2 IP3 | 7.3 | Melancholy | 1:02 - 1:10 | User A SP2 |

FIG. 15

| Intensity Peaks (32) in Emotional Reaction Track (16) User A SP3 ERT3 | | | | |
|---|---|---|---|---|
| ID | Intensity Level | Emotion | Location in Time | Song Profile ID |
| User A SP3 ERT3 IP1 | 6.3 | Melancholy | 0:02 - 0:10 | User A SP3 |
| User A SP3 ERT3 IP2 | 5.2 | Passionate | 0:34 - 0:50 | User A SP3 |
| User A SP3 ERT3 IP3 | 7.1 | Melancholy | 1:02 - 1:10 | User A SP3 |

FIG. 16

| Songs (46) | | | | |
|---|---|---|---|---|
| ID | Title | Source (e.g., hyperlink to song) | Classification | Artist |
| Song A | Title A | Source A | Live Music | Artist A |
| Song B | Title B | Source B | Live Music | Artist B |

FIG. 17

| User A's Current Mood Hypothesis | |
|---|---|
| Emotion | Probability |
| Melancholy | 80% |
| Happy | 10% |
| Elated | 0% |
| Heartbroken | 30% |
| Angry | 10% |
| Passionate | 69% |

FIG. 18

| User A's Target Mood | |
|---|---|
| Emotion | Target |
| Melancholy | 100% |
| Passionate | 100% |

FIG. 19

| Intensity Peaks (32) in Song Profile (18) User C SP1 | | | | |
|---|---|---|---|---|
| ID | Intensity Level | Emotion | Location in Time | Song Profile ID |
| User C SP1 IP1 | 6.9 | Melancholy | 0:02 - 0:10 | User C SP1 |
| User C SP1 IP2 | 5.8 | Passionate | 0:34 - 0:50 | User C SP1 |
| User C SP1 IP3 | 7.8 | Melancholy | 1:02 - 1:10 | User C SP1 |

FIG. 20

| Intensity Peaks (32) in Song Profile (18) User C SP2 | | | | |
|---|---|---|---|---|
| ID | Intensity Level | Emotion | Location in Time | Song Profile ID |
| User C SP2 IP1 | 5.6 | Melancholy | 0:11 - 0:22 | User C SP2 |
| User C SP2 IP2 | 5.9 | Melancholy | 0:44 - 0:55 | User C SP2 |
| User C SP2 IP3 | 8.7 | Wistful | 1:23 - 1:34 | User C SP2 |

FIG. 21

| Intensity Peaks (32) in Song Profile (18) User C SP3 | | | | |
|---|---|---|---|---|
| ID | Intensity Level | Emotion | Location in Time | Song Profile ID |
| User C SP3 IP1 | 1.5 | Upbeat | 0:03 - 0:11 | User C SP3 |
| User C SP3 IP2 | 2.4 | Upbeat | 0:20 - 0:40 | User C SP3 |
| User C SP3 IP3 | 2.6 | Upbeat | 0:57 - 1:24 | User C SP3 |

FIG. 22

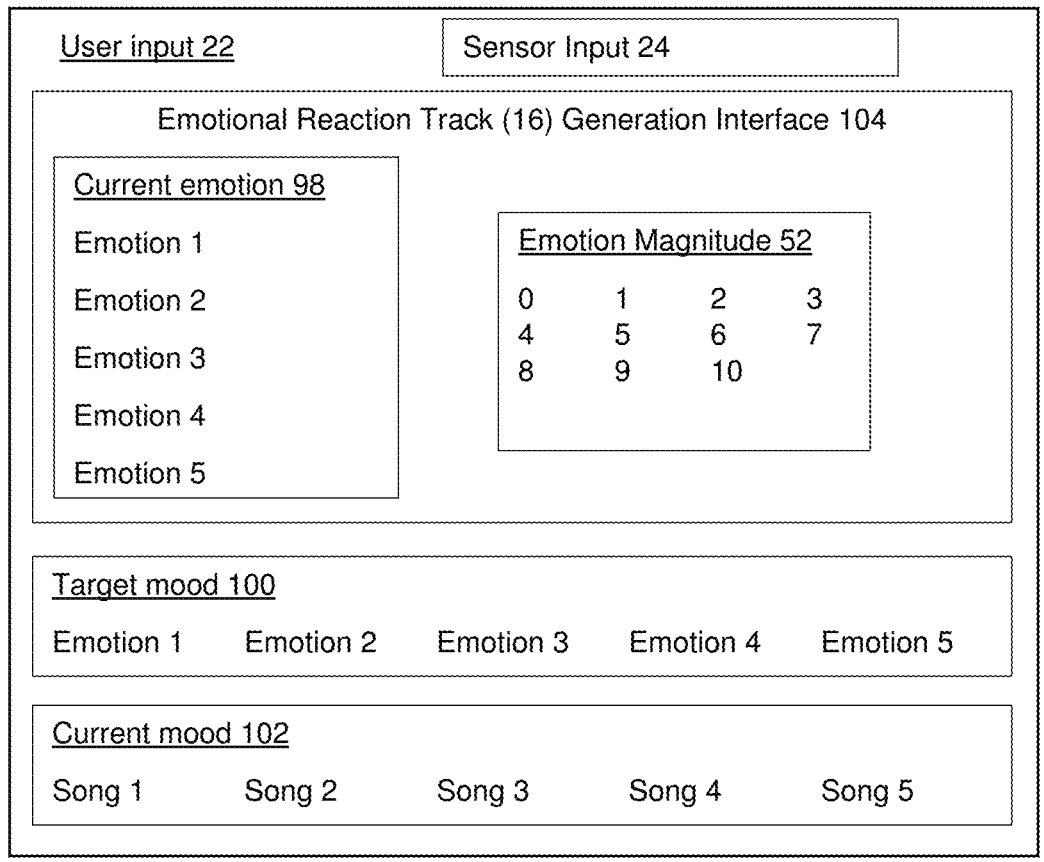
FIG. 23
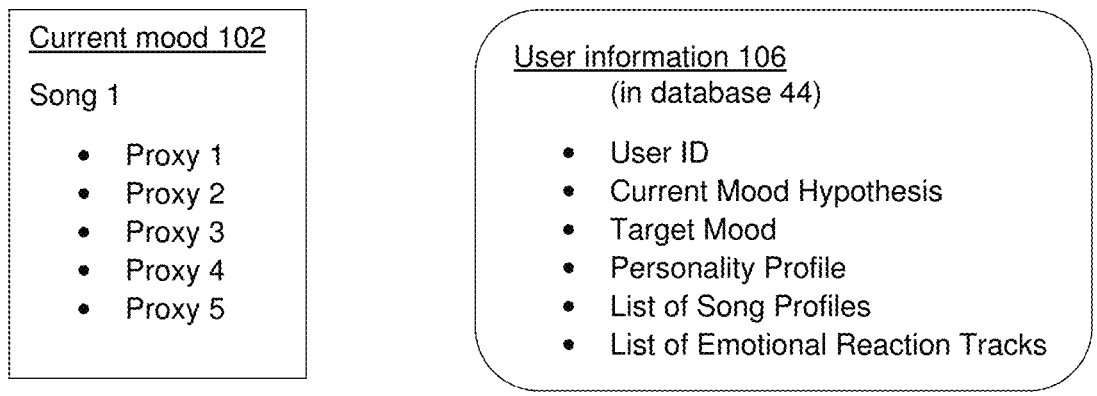
FIG. 24
FIG. 25

| Sensor Input 24 |
|---|
| • Emotion A  → Biological Response A |
| • Emotion B  → Biological Response B |
| • Emotion C  → Biological Response C |

FIG. 29

Emotion Correction Algorithm 122

- Step 1: System 10 communicates prediction to user
- If accurate:
  - No action
- If not accurate:
  - Step 2: System 10 communicates alternative predictions to user
- If accurate:
  - No action
- If not accurate:
  - Repeat Step 2

FIG. 30

MOOD-ALTERING MUSIC RECOMMENDATION SYSTEM BASED ON EMOTIONAL REACTIONS TO ENTERTAINMENT

CROSS-REFERENCE TO RELATED APPLICATIONS

This non-provisional application claims priority to U.S. Provisional Application No. 63/311,082 filed on Feb. 17, 2022, hereby incorporated by reference in its entirety as if fully recited herein.

TECHNICAL FIELD

Embodiments of the present disclosure relate to a system and method for recommending media based on emotion-related feedback from a user. In one example embodiment, songs are assigned to a queue according to objective criteria for achieving desired emotions with the user. In one example embodiment, songs are assigned to a queue based on documented similarities between a first user personality profile and a second user personality profile.

BACKGROUND AND SUMMARY OF THE INVENTION

In recent decades, the digitization of media (e.g., music, film, and the like) has permitted certain platforms to collect feedback from consumers presented with media in a digital medium, and make subsequent suggestions to the consumers based on their feedback. By way of example and not limitation, with certain well-known music streaming platforms (e.g., Pandora, Spotify, or the like), a user may communicate to the platform that certain songs presented to the user are enjoyed by the user (e.g., by selecting a thumbs up marker, like button, or the like) (referred to herein as "positive platform response"). The user may likewise communicate to the platform that certain songs presented to the user are not enjoyed by the user (e.g., by selecting a thumbs down marker, dislike button, or the like) (referred to herein as "negative platform response"). Known platform algorithms may cause music met with a positive platform response to be retained and/or prioritized within a pool of available subsequent songs to play to the user. Likewise, known platform algorithms may cause music met with a negative platform response to be removed and/or not prioritized within the pool of available subsequent songs to play to the user.

The digitization of media has also permitted certain platforms to allow consumers to search media by categorizations therefor. By way of example and not limitation, with the aforementioned well-known music streaming platforms, a user may be permitted to search for and select song playlists, stations, or the like by category, where category may be represented by words signifying one or more emotions (e.g., sad song playlist, happy song playlist, sad song station, happy song station, or the like). As a specific, non-limiting example, a user may wish to be presented with a sad song playlist where the user is feeling depressed, and wishes to validate present emotions. Songs assigned to said playlists, stations, or the like may be subjectively assigned thereto by another platform user, administrator, or the like based on a perception of the other user, administrator, or the like that each of the assigned songs are appropriately represented by the category. As the user is presented with specific songs from a particular playlist, station, or the like, the user may offer positive and/or negative platform responses to adjust the pool of available subsequent songs to play to the user.

A problem with the aforementioned known platform techniques includes by way of example and not limitation, the subjectivity of media categorizations and recommendations involved with said techniques. By way of example and not limitation, a certain song assigned to a playlist labeled as a sad song playlist may indeed be perceived as being a sad song by some users, but not others. The known platform techniques lack an objective framework for labeling, assigning, hypothesizing or the like, user emotions experienced by a particular user as the particular user is presented with media. The known platform techniques also lack an objective framework for attempting to regulate user emotions. Thus, the known platform techniques may not be effective for user-personalized mood regulation, may have limited effectiveness with presenting a user with media that resonates well with the user, some combination thereof, or the like.

Although in recent history, computer models have been introduced for predicting emotional reactions of users with respect to different portions of videos, and recommending other videos to the users based on the predictions (see U.S. Pat. No. 11,176,484 B1), there are notable shortcomings with said computer models. By way of example and not limitation, the known models may still be susceptible to imprecise and/or unreliable data. Known models may rely substantially on verbalizations of a user to make predictions, and said verbalizations may be susceptible to embellishments, inaccuracies, biases, some combination thereof, or the like. As another non-limiting example, known models may lack an effective framework for permitting different users to form connections with one another, share information about oneself with one another, have music recommended thereto based on profiled similarities, some combination thereof, or the like.

Certain known social media platforms, web-based relationship forming platforms (e.g., online dating platforms), and the like (each of which are unrelated to the aforementioned known models) may permit a user thereof to digitally share information about the user with other users. However, said platforms often suffer from unreliable reporting, such as from, by way of example and not limitation, the tendency of certain users to embellish, inaccurately report, poorly articulate, some combination thereof, or the like certain information about oneself. As a specific, non-limiting example, with known online dating platforms, certain users may embellish or inaccurately report certain information about oneself in order to increase their chances of matching and/or forming a relationship with desired other users. As a result, some users may experience frustration, dissatisfaction, or the like at having matched and/or having formed a relationship (even if only briefly) with someone who did not accurately report information about oneself.

The aforementioned shortcomings speak to the need for a system and method for gathering emotional feedback data from a user in real time while the user is presented with certain media, and using said feedback to recommend other media to the user, wherein the system involves an objective, regulatory framework for recommending the other media, said framework involving comparison of accurately formed personality profiles.

In view of this, it is beneficial to have a mood-altering music recommendation system based on emotional reactions to entertainment, and a corresponding method therefor.

An exemplary embodiment of the present invention provides a system and method for recommending media based on emotion-related feedback from a user.

According to the present invention in one aspect, an exemplary system for recommending media based on feedback from a user comprises a processor, configured with instructions to generate, during or after each instance the user experiences a first media element, a first plot demonstrating the user's emotional intensity reaction to the first media element over time. The processor may be further configured with instructions to generate a second plot demonstrating the user's average emotional intensity reaction over time to the first media element. The processor may also be configured to verify an intensity threshold of the user's emotional intensity reaction to the first media element over time. The processor may additionally be configured to recommend a second media element to the user based on at least one selected from the group of the first and the second plot. The processor may further be configured to assign information from at least one selected from the group of the first and the second plot to a personality profile of the user.

According to the present invention in another aspect, an exemplary method for recommending media based on feedback from a user comprises providing a processor, and configuring the processor with instructions to generate, during or after each instance the user experiences a first media element, a first plot demonstrating the user's emotional intensity reaction to the first media element over time. The method may involve configuring the processor with instructions to generate a second plot demonstrating the user's average emotional intensity reaction over time to the first media element. The method may additionally involve configuring the processor with instructions to compare the first plot to the second plot, and to evaluate a difference therebetween. The method may also involve configuring the processor to verify an intensity threshold of the user's emotional intensity reaction to the first media element over time. Furthermore, the method may involve configuring the processor to recommend a second media element to the user based on at least one selected from the group of the first plot and the second plot. Additionally, the method may involve configuring the processor to assign information from at least one selected from the group of the first plot and the second plot to a personality profile of the user.

With exemplary embodiments of the present invention, media recommendations may be tailored to regulating a specific user's emotional state, and the user may be presented with media that resonates well with the user. Exemplary embodiments may be useful in permitting multiple users to form relationships with one another, and may circumvent issues with inaccurate self-reporting. Additional aspects and advantages of the present invention will become apparent to those of ordinary skill in the art based on the drawings and detailed description thereof below.

BRIEF DESCRIPTION OF THE DRAWINGS

Novel features and advantages of the present invention, in addition to those expressly mentioned herein, will become apparent to those skilled in the art from a reading of the following detailed description in conjunction with the accompanying drawings. The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 4 illustrates an exemplary mood hypothesis adjustment framework in accordance with an exemplary embodiment of the present invention;

FIG. 7 illustrates exemplary personality profile data in accordance with an exemplary embodiment of the present invention;

FIG. 8 illustrates other exemplary personality profile data in accordance with the FIG. 7 embodiment;

FIG. 9 illustrates exemplary song profile data in accordance with an exemplary embodiment of the present invention;

FIG. 10 illustrates exemplary emotional reaction track data in accordance with the FIG. 9 embodiment;

FIG. 11 illustrates exemplary song profile intensity peak data in accordance with the FIG. 9 embodiment;

FIG. 12 illustrates other exemplary song profile intensity peak data in accordance with the FIG. 9 embodiment;

FIG. 13 illustrates yet other exemplary song profile intensity peak data in accordance with the FIG. 9 embodiment;

FIG. 14 illustrates exemplary emotional reaction track intensity peak data in accordance with the FIG. 9 embodiment;

FIG. 15 illustrates other exemplary emotional reaction track intensity peak data in accordance with the FIG. 9 embodiment;

FIG. 16 illustrates yet other exemplary emotional reaction track intensity peak data in accordance with the FIG. 9 embodiment;

FIG. 17 illustrates exemplary song information in accordance with an exemplary embodiment of the present invention;

FIG. 18 illustrates exemplary mood hypothesis data in accordance with an exemplary embodiment of the present invention;

FIG. 19 illustrates exemplary target mood data in accordance with an exemplary embodiment of the present invention;

FIG. 20 illustrates yet other exemplary song profile intensity peak data in accordance with the FIG. 9 embodiment;

FIG. 21 illustrates yet other exemplary song profile intensity peak data in accordance with the FIG. 9 embodiment;

FIG. 22 illustrates yet other exemplary song profile intensity peak data in accordance with the FIG. 9 embodiment;

FIG. 23 illustrates an exemplary user input interface in accordance with the FIG. 1 embodiment;

FIG. 24 illustrates an exemplary current mood interface in accordance with the FIG. 23 embodiment;

FIG. 25 illustrates exemplary user information of an exemplary database in accordance with an exemplary embodiment of the present invention;

FIG. 29 illustrates exemplary sensor input in accordance with the FIG. 1 embodiment; and FIG. 30 illustrates an exemplary emotion correction algorithm in accordance with an exemplary embodiment of the present invention.

Figure 1:
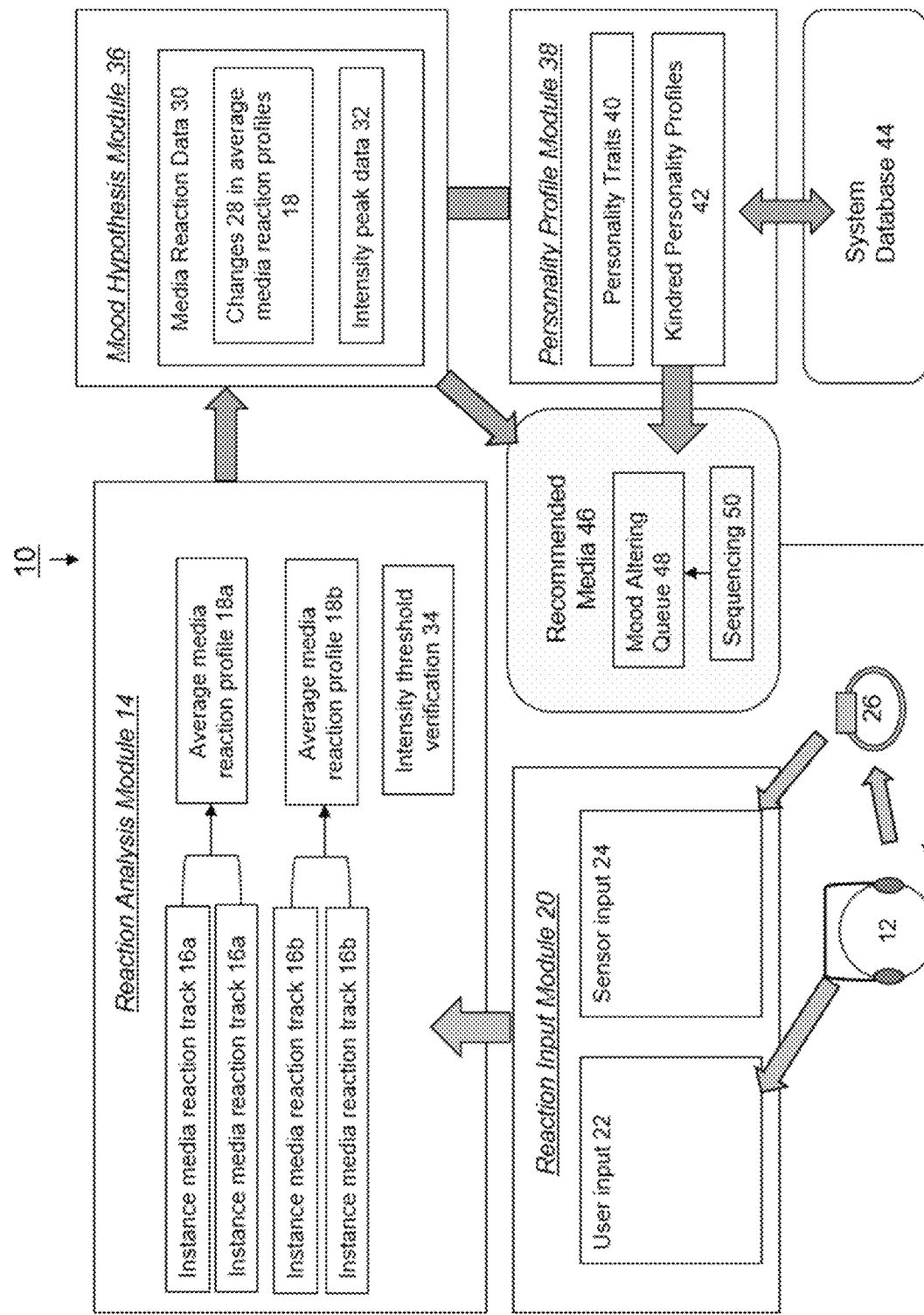
FIG. 1 illustrates exemplary logic of a preferred media recommendation system in accordance with an exemplary embodiment of the present invention.

DETAILED DESCRIPTION OF EXEMPLARY
EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein may be made without departing from the scope and spirit of the present invention. In addition, descriptions of well-known functions and constructions are omitted for clarity and conciseness.

The term "autonomous," as used herein, refers to any process or operation substantially executed without material human input when the process or operation is performed. The term "computer readable medium," as used herein, refers to any tangible storage and/or transmission medium adapted to provide instructions to a processor for execution. An exemplary computer readable medium may include by way of example and not limitation, non-volatile media, volatile media, and transmission media. The term "user," as used herein, refers to any user of an exemplary system and/or method in accordance with an embodiment of the present invention. The term "mood," as used herein, refers to a user's present state of experienced emotion(s), which may be expressed by the user, suggested by physiological response input, some combination thereof, or the like.

The term "instance song reaction track," as used herein (also referred to herein as "emotional reaction track" or "ERT"), refers to all system-documented and organized feedback pertaining to a user's emotions, and magnitudes thereof, assigned to and/or communicated to the system, preferably in real time, over the duration of one instance of the user listening to a particular song. The term "instance media reaction track," as used herein, refers to all system-documented and organized feedback pertaining to a user's emotions, and magnitudes thereof, assigned to and/or communicated to the system, preferably in real time, over the duration of one instance of the user sensing (e.g., listening to, watching, some combination thereof, or the like) a particular media element, including by way of example and not limitation, songs, other audio tracks, videos, some combination thereof, or the like.

The term "average song reaction profile," as used herein (may also be referred to herein as "average emotion reaction track"), refers to a representation of all ERTs obtained for a particular song, wherein assigned and/or communicated emotion magnitudes are averaged at the approximate temporal location of each occurrence of said emotion magnitudes within the song. The term "average media reaction profile," as used herein, refers to a representation of all instance media reaction tracks obtained for a particular media element, wherein assigned and/or communicated emotion magnitudes are averaged at the approximate temporal location of each occurrence of said emotion magnitudes within the media element.

The term "song profile," unless otherwise indicated herein, refers to a collection of information within an exemplary system of the present invention, the collection of information including at least the average song reaction profile. The collection of information may further include one or more selected from the group of the song title, performance medium (e.g., video, audio, some combination thereof, or the like), user information (e.g., user identification language, referred to herein as "User ID"), all ERTs for the particular song, and other identification data (e.g., artist name, performance venue name, album name, hyperlink to media element, some combination thereof, or the like). The term "new system session," as used herein, refers to a user initiating engagement with an exemplary system after an amount of time has passed since the user last engaged the exemplary system. By way of example and not limitation, a new system session may occur each time a user logs on to system software through, e.g., a software interface of an exemplary system.

For illustrative purposes, numerous exemplary embodiments illustrated and described herein reference music and songs, and users listening to music/songs. However, it will be apparent to one of ordinary skill in the art that the present invention is not intended to be limited to songs, and may include any number of other media elements (also referred to herein as "media" or "entertainment elements"), including by way of example and not limitation, music videos, movies, audiobooks, speeches (e.g., political speeches), comedy performances (e.g., videos and/or audio tracks of comedy performances), dance performances (e.g., videos of dance performances), other videos (with or without sound), other audio tracks, some combination thereof, or the like. Accordingly, the present invention is not intended to be limited to users providing feedback based only on auditory stimuli. Auditory stimuli may be supplemented or replaced with other sensory stimuli, including by way of example and not limitation, visual stimuli, without departing from the scope of the present invention.

Referring initially to FIG. 1, an exemplary system 10 for recommending media to a user 12 based on the user's 12 emotional responses to entertainment is shown. In this particular embodiment, the system 10 includes a plurality of software modules (14, 20, 36, 38, 46) tailored to obtaining and processing feedback registered from the user 12. The reaction input module 20 may be configured to obtain, preferably in real time, data relevant to emotions of the user 12. Said data may be provided as user input 22, as described in more detail below. Said data may, alternatively or additionally, be provided as sensor input 24, as described in more detail below. The reaction analysis module 14 may be configured to register and/or organize said data into instance media reaction tracks (e.g., 16*a-b*). In this particular embodiment, two media elements (a-b) are experienced (e.g., listened to, watched, some combination thereof, or the like) by the user 12, and the user 12 experiences each media element (a-b) twice (two instance media reaction tracks 16*a* are shown for media element "a," and two instance media reaction tracks 16*b* are shown for media element "b"). It will be apparent to one of ordinary skill in the art that any number of different media elements, and any number of instance media reaction tracks per media elements may be registered and/or organized by an exemplary reaction analysis module without departing from the scope of the present invention.

The reaction analysis module 14 may also be configured to assign an average media reaction profile (18a-b) for each media element. For each group (e.g., 16a and 16b) of instance media reaction tracks, the reaction analysis module 14 may be configured to average assigned and/or communicated emotion magnitudes thereof at the approximate temporal location of each occurrence of said emotion magnitudes within the media element. The reaction analysis module 14 may further be configured to verify (intensity threshold verification 34) that each media element (e.g., a-b) experienced by the user 12 satisfies an emotional threshold, described in more detail below, before being considered for subsequent recommendation.

The mood hypothesis module 36 may be configured to register media reaction data 30, which may be electronically communicated to the mood hypothesis module 36 from the reaction analysis module 14, and analyze the media reaction data 30 to determine which media to recommend to the user 12. Media reaction data 30 may include by way of example and not limitation, intensity peak data 32 and changes 28 in average media reaction profiles 18, described in more detail below. Media reaction data 30 may be organized into a hypothesis data field referred to herein as the "mood hypothesis." The personality profile module 38 may be configured to predict personality traits 40 of the user 12 based on how the user has reacted to various media over time (e.g., reflected in media reaction data 30). The user 12 may be one user of system 10 among a large plurality of users, wherein each user may be assigned a personality profile comprising personality traits 40 of the user. Data (e.g., 30, 40) of each user may be stored, communicated, or the like to a system database 44. The personality profile module 38 may be in electronic communication with the system database 44, and may be configured to predict which other users of the system 10 are compatible with the user 12. Compatible users may be referred to herein as having "kindred personality profiles" (42).

A module for recommended media 46 may be in electronic communication with the mood hypothesis module 36 and the personality profile module 38. Information from the mood hypothesis module 36 and the personality profile module 38 may determine which media is to be assigned to a media queue 48 (may also be referred to herein as a "mood altering queue"). The module for recommended media 46 may include exemplary sequencing 50 of the media queue 48, as described in more detail below. The system database 44 may be configured to store and communicate any number of different datasets specific to any number of different users of system 10, to, by way of example and not limitation, promote determination of kindred personality profiles 42, promote media recommendation and sequencing 50 of an exemplary queue 48, some combination thereof, or the like. Media that a user has not experienced before by the user may be prioritized.

Referring again to the reaction input module 20, the user 12 may manually provide emotional feedback (user input 22) to the reaction input module 20 while the user 12 is being exposed to a media element. This may be referred to herein as "explicit emotion assignment." Alternatively, or additionally, feedback associated with the user 12 may be autonomously provided (e.g., sensor input 24) to the reaction input module 20 while the user 12 is being exposed to a media element. By way of example and not limitation, a device configured to register physiological responses (e.g., smart watch 26) may provide feedback to the reaction input module 20, and said feedback may be associated with user 12 emotional responses (also referred to herein as "implicit emotion assignment"). It will be apparent to one of ordinary skill in the art that there may be any number of different devices and/or methods available for providing user emotional response feedback (e.g., 22, 24) to an exemplary reaction input module 20 without departing from the scope of the present invention. It will also be apparent to one of ordinary skill in the art that the names and categorizations of modules herein are merely illustrative, and are in no way exhaustive of the scope of the present invention.

Explicit emotion assignment may involve any number of different data gathering techniques without necessarily departing from the scope of the present invention. Referring now to FIGS. 1 and 23, an interface 99 of the reaction input module 20 may provide options for both user input 22 and sensor input 24. The user input 22 options may include an option to open an emotional reaction track (16) generation interface 104. Alternatively, or additionally, the system 10 may direct the reaction input module 20 to automatically display the emotional reaction track (16) generation interface 104 to the user 12 whenever the user 12 is presented with a media element. As the user 12 experiences a media element, the user may engage interface 104 to provide emotional feedback to the system 10 in real time and/or post-hoc. By way of example and not limitation, as a song progresses from start to finish (or in a visual representation of an emotional reaction track available immediately after the user has listened to the song), the user 12 may toggle between and select each of various emotions the user 12 is feeling at given points in the song from a current emotion 98 dropdown menu, and the user 12 may select a perceived magnitude for each selected emotion from an emotion magnitude dropdown menu.

Figure 2:
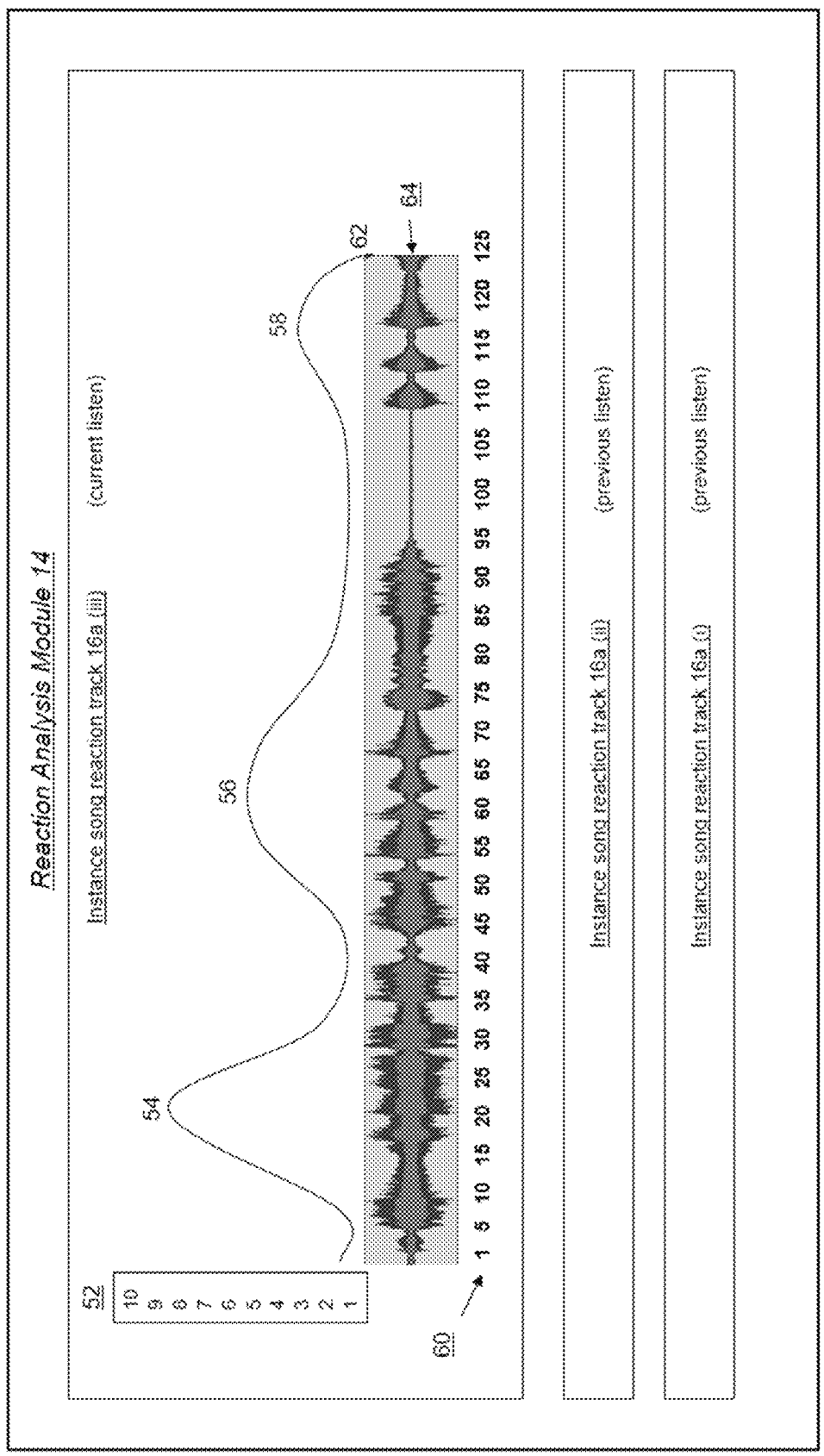
FIG. 2 illustrates an exemplary reaction analysis module interface and an exemplary instance song reaction track of the FIG. 1 embodiment.

Referring now to FIGS. 2 and 23, the system 10 may assign each selected emotion and its corresponding magnitude as an ordered pair (e.g., the time of the song the emotion occurs may be represented by an x coordinate, and the magnitude of the emotion felt at that particular time may be represented as a y coordinate) to an instance song reaction track plot (e.g., 16a (iii)). The system 10 may form a graph based on, by way of example and not limitation, illustrating each ordered pair as a plotted point, assigning one or more polynomial functions to represent one or more relationships between ordered pairs, dividing the media element into time segments along the x axis and formatting the plot as a bar graph, labeling various points across the graph with the selected emotion(s) corresponding to each point, some combination thereof, or the like. It will be apparent to one of ordinary skill in the art that the aforementioned ordered pairs are not necessarily limited to any particular amount of time. By way of example and not limitation, a plotted point may represent a fraction of a second, a second, or more than a second without departing from the scope of the present invention. It will also be apparent to one of ordinary skill in the art that there may be any number of different methods for expressing an exemplary instance media reaction track without necessarily departing from the scope of the present invention.

Referring specifically to FIG. 2, an exemplary instance song reaction track 16a (iii) plot is shown for a user's most current listen of song (a). In the particular embodiment shown, the user has previously listened to song (a) twice in accordance with an exemplary system, and an option to view three different instance song reaction tracks (16*a* (i)-(iii)) from an interface of the reaction analysis module 14 is illustrated. Explicit emotion assignment may involve the user being able to engage a configurable graph (e.g., 16*a* (iii) plot) while the song (e.g., song (a)) is playing. By way of example and not limitation, a configurable graph area (e.g., 16*a* (iii) plot) may be displayed on a touch screen interface as the song (e.g., song (a)) is playing, and the user may select a portion of the x, y field of the configurable graph area to input a point thereto. A touch screen interface may include any number of different screen sensors. The point may indicate that an emotion was felt at a particular time in the song (x coordinate), as well as to indicate the magnitude of the emotion (y coordinate).

The user may assign emotional labels (also referred to herein as "emotion label(s)" or "emotion reaction label(s)") to each point immediately after inputting the point by, for example not by way of limitation, selecting one or more emotions from a current emotion drop down menu. The system may be configured to present the current emotion dropdown menu proximate to each point immediately after input of the point. Referring again to both FIGS. 2 and 23, it will be apparent to one of ordinary skill in the art that these embodiments are merely illustrative, and there may be any number of different methods for obtaining emotional input from a user without necessarily departing from the scope of the present invention.

An exemplary system may be configured to assign the user's most commonly selected emotion to the top of the current emotion dropdown menu (e.g., emotion 1 out of emotions 1-5 in dropdown menu 98 may be assigned to the top of the dropdown list for being the most selected option in that list by a particular user, and/or for being the most selected option in that list by a group of users having kindred personality profiles with respect to the particular user). An exemplary system may, alternatively or additionally, be directed to prioritize the most recently selected option to the top of the current emotion dropdown menu. It will be apparent to one of ordinary skill in the art that there may be any number of different methods for organizing options in a current emotion dropdown menu without departing from the scope of the present invention. Emotion label options (e.g., emotions 1-5 in dropdown menu 98) may include, by way of example and not limitation, gloomy, melancholy, happy, elated, heartbroken, angry, passionate, or the like. It will be apparent to one of ordinary skill in the art that the aforementioned example emotion labels are in no way exhaustive of the scope of the present invention, and any number of different emotion labels, whether or not characterized as words, may be employed without departing from the scope of the present invention.

It will also be apparent to one of ordinary skill in the art that explicit emotion assignment may involve any number of different devices without necessarily departing from the scope of the present invention. By way of example and not limitation, a stylus, analog stick, knob, buttons, cameras, microphones, some combination thereof, or the like may be provided at a configurable area (referred to herein as "mood calibration dashboard") of a user system device (e.g., smart phone), and the user may engage one or more of said devices to provide emotional feedback to the system. The mood calibration dashboard may be used in this way to permit the user to communicate one's current emotions to an exemplary system. An exemplary use of a preferred mood calibration dashboard involves the user being able to turn a knob to heighten an emotion (e.g., the program may play a song known to heighten a given emotion in response to the user turning the knob) (e.g., the knob may be a virtual knob). Referring now to FIGS. 1-2, said provided emotional feedback may be utilized by the system to form instance media reaction tracks (e.g., 16*a-b*), which may be assigned to an average media reaction profile (e.g., 18*a-b*), which may be assigned to a media profile (e.g., song profile).

Referring to FIGS. 1, 23 and 29, user emotional response feedback may, alternatively or additionally, comprise implicit emotion assignment. By way of example and not limitation, sensor input 24 may be obtained from any number of different devices, including by way of example and not limitation, a smartwatch 26, and the sensor input 24 may involve data pertaining to biological responses of the user 12 over time as a media element progresses. Various biological responses (e.g., biological responses A-C) of the user 12 may each be associated with a predicted emotional response of the user 12 (e.g., emotions A-C) at a particular point in the media element progression. As emotional responses across the temporal progression of the media element are predicted based on biological response data, the system 10 may generate an instance media reaction track (e.g., 16*a*).

Any number of different physiological responses to media may be detected using an exemplary detection device (e.g., 26). By way of example and not limitation, crying, cringing, forming "goosebumps" (horripilation), developing temperature changes on the skin, sweating, change in heart rate, closing of the eyes, laughing uncontrollably, grimacing, some combination thereof, or the like are each physiological responses that may occur when a user 12 is presented with media, and each physiological response may potentially be associated with a user emotion and a magnitude thereof. As a specific example not by way of limitation, a smart watch 26 may be configured to detect when horripilation occurs when a user 12 is listening to a song, and communicate to the reaction input module 20 when horripilation occurs, and at what magnitude. The reaction analysis module 14 may be configured to associate an instance of horripilation with euphoria, horror, some combination thereof, or the like (e.g., biological response may be associated with a specific emotion based on the context of which media element is involved, and at what time the biological response occurred during the media element) (e.g., an exemplary system may look what emotion is associated with time (t) in a media element by the user and/or users with kindred personality profiles to evaluate context and/or assign specific emotions to an intensity peak associated with a user's biological response). For significant horripilation at time (t), the reaction analysis module 14 may be configured to label in an instance song reaction track that euphoria occurred at time (t) at a significant magnitude.

Other exemplary detection devices may include by way of example and not limitation, EDA sensors, heart rate sensors, any number of other biological sensors (preferably comfortable to the user 12), facial recognition technology (e.g., to detect crying, frowning, smiling, some combination thereof, or the like), some combination thereof, or the like. It will be apparent to one of ordinary skill in the art that any number of different methods or devices for performing implicit emotion assignment may be employed without necessarily departing from the scope of the present invention.

Referring again to FIG. 2, where a graph of a user's emotional response feedback to a particular song (instance song reaction track 16*a* (iii)) is shown, emotion intensity 52 may be measured on a 1-10 scale. Emotion intensity 52 experienced by the user in response to the song (e.g., song (a)) may be displayed on the y axis of an exemplary graph.

A measure of 1 may correspond to no emotional reaction, and a measure of 10 may correspond to a very strong emotional reaction. It will be apparent to one of ordinary skill in the art, however, that emotion intensity may be measured according to any number of different scales and/or metrics without departing from the scope of the present invention.

In this particular embodiment, the instance song reaction track 16a (iii) is displayed on an interface of a reaction analysis module 14, but such is not required. Temporal progression 60 of the song (e.g., song (a)) may be displayed on the x axis of an exemplary graph. In the FIG. 2 embodiment, temporal progression 60 of song (a) is measured in seconds (0-125 seconds). It will be apparent to one of ordinary skill in the art, however, that any number of different media of any number of different time durations may be expressed in an instance media reaction track without departing from the scope of the present invention. Also shown in the FIG. 2 embodiment is an amplitude time plot 64 of song (a). Amplitude may relate to relative strength and/or shape of sound waves. With certain exemplary embodiments, comparing amplitude time plots (e.g., 64) to plotted emotional reactions (e.g., 54, 56, 58, 62) may be beneficial for evaluating whether the relative strength and/or shape of sound waves influences a particular user's emotional reactions. It will be apparent to one of ordinary skill in the art that there may be any number of different devices or methods available for expressing physics characteristics of media and comparing said characteristics with emotional reactions to evaluate and/or predict relationships therebetween without necessarily departing from the scope of the present invention.

Changes in the user's emotion level felt during a song may be reflected by the instance song reaction track (e.g., 16a (iii)) graph as a whole. Approximate peaks (e.g., 54, 56, 58) in exemplary graphs of emotion response data may be referred to herein as "emotion intensity peaks" or "intensity peaks." Each intensity peak may represent a perceived high level of emotion experienced during a point in the song relative to other points in the song. Approximate troughs or valleys (e.g., 62) in exemplary graphs of emotion response data may be referred to herein as "emotion intensity troughs" or "intensity troughs." Each intensity trough may represent a perceived low level of emotion experienced during a point in the song relative to other points in the song. Each intensity peak and/or trough may be associated with an emotion reaction label (e.g., selected from a dropdown menu). Although preferred embodiments may express an entire song on an instance song reaction track, such is not necessarily required. Each intensity peak and/or trough may be determined according to one or more exemplary methods (e.g., explicit emotion assignment, implicit emotion assignment, some combination thereof, or the like) for obtaining instance media reaction track data.

Referring again to both FIGS. 2 and 23, emotion labels may include human readable identification. As a specific, non-limiting example, referring to the current emotion 98 dropdown list in FIG. 23, emotion 1 may include the label "happy," and emotion 2 may include the label "sad." It will be apparent to one of ordinary skill in the art, however, that human readable identification is not necessarily required for an exemplary emotion label. By way of example and not limitation, an emotion label may comprise non-human readable code without necessarily departing from the scope of the present invention. It will also be apparent to one of ordinary skill in the art that instance media reaction track data is not necessarily limited to information shown in the embodiments illustrated herein. By way of example and not limitation, instance media reaction track data stored, organized, displayed, some combination thereof, or the like by an exemplary system may include song title, artist, performance venue, album, hyperlink, medium played in (e.g., video, audio, some combination thereof, or the like), other song identification information, user identification information, some combination thereof, or the like. An exemplary system may store, organize, display, some combination thereof, or the like any number of exemplary instance media reaction tracks for a particular media element.

Figure 3:
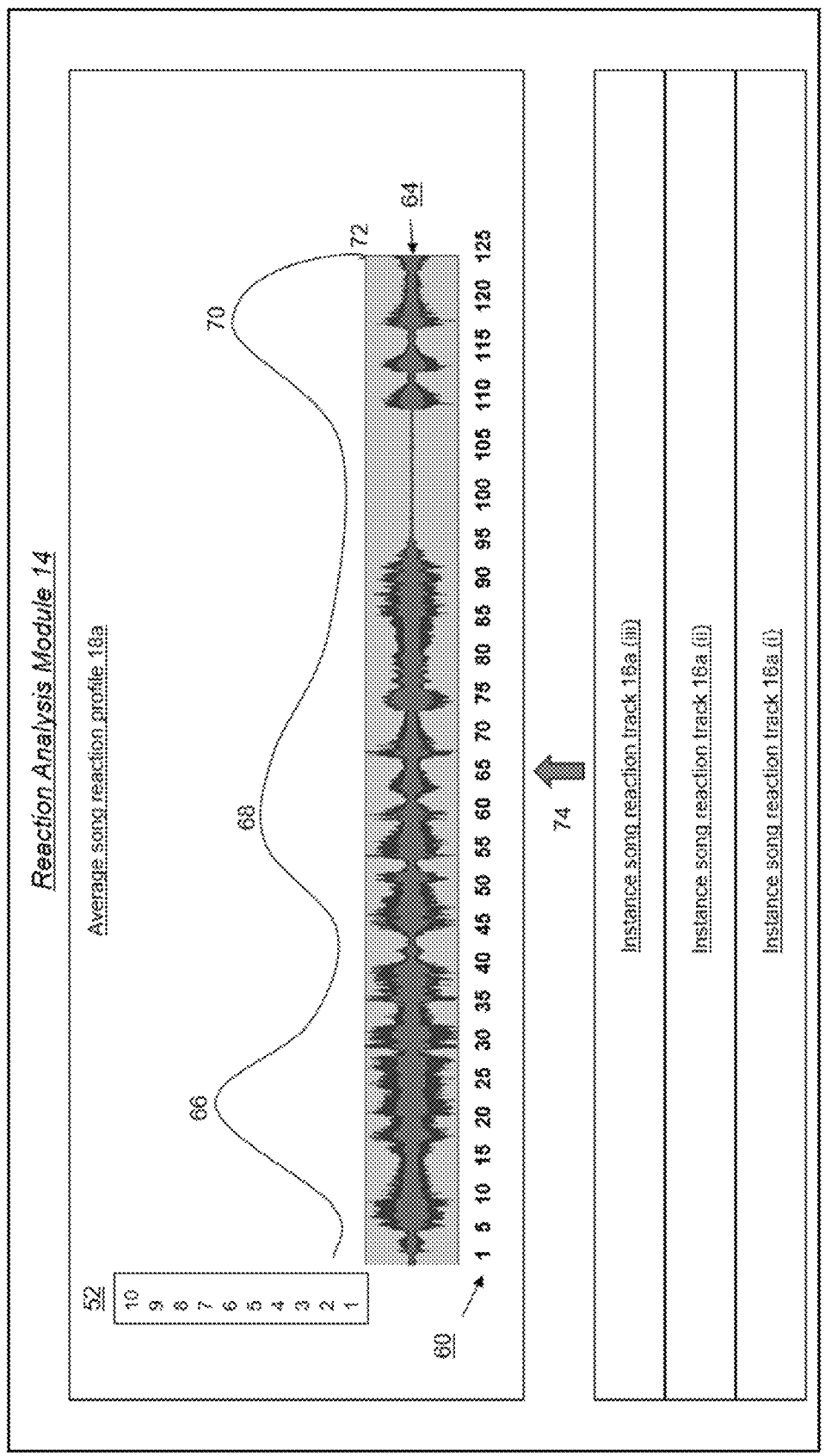
FIG. 3 illustrates an exemplary reaction analysis module interface and an exemplary average song reaction profile of the FIG. 1 embodiment.

Referring now to FIG. 3, a display of a user's collective emotional response feedback to a particular song (song (a)) may be organized into a single graph (e.g., average song reaction profile 18a). The aforementioned single graph may be displayed by a reaction analysis module 14 interface, but such is not required. It will also be apparent to one of ordinary skill in the art that collective emotional response feedback to a particular media element is not necessarily limited to being organized into a single graph. In the FIG. 3 embodiment, as a specific, non-limiting example, a user has listened to song (a) three times in accordance with an exemplary system, and three ERTs (16a (i)-(iii)) have been generated by the exemplary system for the user. An exemplary average media reaction profile (e.g., average song reaction profile 18a) may include similar or substantially identical scales and/or metrics as those of each instance media reaction track (e.g., ERTs in FIG. 2). By way of example and not limitation, here, similar to the FIG. 2 embodiment, emotion intensity level 52 is represented on the y axis, and temporal progression 60 of the song is represented on the x axis. An exemplary average media reaction profile (e.g., average song reaction profile 18a) may further include an amplitude time plot (e.g., 64).

Based on one or more of any number of different reasons, a user's mood and level of focus may vary between each instance the user listens to a particular song, thus, different ERTs for the same song may vary between one another. The system may combine data from different ERTs in an average song reaction profile to reflect how the user has, on average, emotionally reacted to the particular song. It will be apparent to one of ordinary skill in the art that there may be any number of different methods for generating an average media reaction profile without departing from the scope of the present invention. By way of example and not limitation, an exemplary system may be configured to determine where intensity peaks and troughs occurred in each ERT, and if the number and approximate temporal locations of intensity peaks and troughs are similar enough between each ERT, plot the average emotion intensity 52 and temporal location of each intensity peak and trough. Exemplary logic for plotting an average intensity peak may include the following:

$$[(Mt)a = \Sigma_{i=1}^{n}(Et)i/n, (MI)a = \Sigma_{i=1}^{n}(EI)i/n] \quad MP_a \text{ coordinates:}$$

In this particular illustrative, non-limiting example, $MP_a$ refers to mean emotion intensity peak number (a). There may be multiple (e.g., a, b, c) emotion intensity peaks in an exemplary average song reaction profile. Each mean (M) intensity peak (or trough) plotted on an average song reaction profile may have an x coordinate corresponding to time (t) in the song an emotion was experienced, and a y coordinate corresponding to intensity (I) of the emotion. The sum ($\Sigma_{i=1}^{n}(Et)i$) of each time coordinate for each ERT (Et) may be divided by the number (n) of ERTs to determine the x coordinate (mean time for peak number (a), or "(Mt)a"), and the sum ($\Sigma_{i=1}^{n}(EI)i$) of each emotion intensity coordinate for each ERT (EI) may be divided by the number (n) of ERTs to determine the y coordinate (mean intensity for peak number (a), or "(MI)a"). The system may be configured to verify temporal proximity of each ERT peak number (a) to other ERT peaks of number (a) before averaging 74 them, but such is not required. The system may also be configured to verify similarity of labeled emotions with respect to each ERT peak number (a) to other ERT peaks of number (a) before averaging them (e.g., in order to assign a common emotion label to an averaged peak), but such is not required.

As another non-limiting example, the average song reaction profile (e.g., 18a) may be determined by plotting all points from each ERT on a graph of the average song reaction profile, and assigning one or more polynomial functions to the graph to represent one or more relationships between the points. The system may be configured to label different portions of the plotted function(s) with emotional labels from the ERTs (e.g., each peak and trough in a plotted function may be labeled with an emotion label representing an averaged emotional response). The aforementioned examples of averaging ERT data are in no way exhaustive of the scope of the present invention, and additional mechanisms for averaging instance media reaction track data may become apparent without departing from the scope of the present invention. It will also be apparent to one of ordinary skill in the art that an exemplary system is not limited to any particular number of average media reaction profiles or any particular number of instance media reaction tracks.

The average song reaction profile 18a of FIG. 3 represents an average of ERTS 16a (i)-(iii). Intensity peaks (66, 68, 70) therein may represent portions of song (a) where the user, on average, had a peak emotional reaction thereto. Intensity troughs (e.g., 72) therein may represent portions of song (a) where the user, on average, had a lower emotional reaction thereto relative to other points in song (a). An exemplary system may be configured to update an average media reaction profile after each subsequent instance a user experiences the media element represented by the average media reaction profile. It will also be apparent to one of ordinary skill in art that emotional labels may be characterized by any number of different selectable indicators, including by way of example and not limitation, colors, emojis, symbols, non-word form identifiers, some combination thereof, or the like.

In certain exemplary embodiments, emotion labels for any number of different instance media reaction tracks may, alternatively or additionally, be numerically weighted from most prominent to least prominent, and resulting weights may be averaged. Averaged media reaction profiles may be used as a baseline to compare future instance media reaction tracks to, as described in more detail below.

Referring now to FIGS. 2-3, intensity peaks (e.g., 54, 56 and 58 with the instance song reaction track 16a (iii)) (e.g., 66, 68 and 70 with the average song reaction profile 18a) may each be labeled with an emotion. Respective peaks 54 and 66 may be labeled as a peak heartbroken emotional reaction, respective peaks 56 and 68 may be labeled as a peak sad emotional reaction, and respective peaks 58 and 70 may be labeled as a peak regretful emotional reaction. The aforementioned example emotional reaction labels are merely illustrative, and are in no way exhaustive of the scope of the present invention. Where an exemplary system (80) plays a first media element (e.g., song (a)) for a user, and associates an emotion label with an intensity peak, the system 80 may test a hypothesis that said association is accurate by playing, in close temporal proximity to the first media element, a second media element (e.g., song (b)) comprising an intensity peak with a substantially similar or identical emotion. By way of example and not limitation, where both the intensity peak corresponding to the emotion label in song (a) and the intensity peak corresponding to the emotion label in song (b) are both elevated in corresponding ERTs (e.g., relative to corresponding intensity peaks in initial average song reaction profiles therefor), the system 80 may increase the probability that the emotion label(s) for the intensity peak(s) in the song(s) is/are accurate (e.g., similar to how emotion probabilities are calculated and/or recalculated in an exemplary mood hypothesis, but here, a prediction may be made regarding the mood a media element elicits in the user based on said increase in probability that emotion labels are accurate). Thus, an exemplary system (80) may predict the emotions of (elicited by) a media element (referred to herein as "media element emotion"), as well as the emotions of a user in order to, e.g., associate the media element with emotion of the user. It will be apparent to one of ordinary skill in the art that there may be any number of different methods employed for determining media element emotion without departing from the scope of the present invention.

Where two average media reaction profiles have similar, higher than average emotion intensity peaks and labels, the program may direct the two media elements thereof to be presented to a user subsequent to one another to assess a hypothesis that the two media elements elicit a similar emotional response from the user. An exemplary hypothesis being tested may include, by way of example and not limitation, that two media elements elicit elevated intensity peaks together. Exemplary testing may include evaluation of whether a first media element's (song's) assigned intensity peak (e.g., labeled by an exemplary system, with limited confidence, as eliciting a sad response from the user) (e.g., in accordance with exemplary determining of media element emotion) is occurring in temporal proximity to a second media element's (song's) intensity peak (e.g., labeled by an exemplary system, and/or user, with more confidence, as eliciting a sad response from the user) to determine if the two elicit elevated intensity peaks together (e.g., where the two elicit elevated intensity peaks together, a hypothesis that the emotions are similar may be confirmed).

Referring now to FIGS. 1-2 and 3B-4, the mood hypothesis module 36 may be configured to compare an average song reaction profile (e.g., 18a, reflecting an averaging 74 of instance song reaction tracks 16a (i)-(ii), each relating to previous listens of song (a) by user 12) with an instance song reaction track for a most current listen of a song (e.g., 16a (iii), reflecting an ERT for the most current listen of song (a) by user 12). The FIG. 3B average song reaction profile 18a includes emotion intensity level 52 represented on the y axis, temporal progression 60 of the song represented on the x axis, labeled intensity peaks (66, 68 and 70) and troughs or valleys (e.g., 72), and an amplitude time plot 64. The average song reaction profile 18a of FIG. 3B may be displayed on an interface of the reaction analysis module 14, although such is not required. By way of example and not limitation, respective peaks 54 and 66 may be labeled as a peak heartbroken emotional reaction, respective peaks 56 and 68 may be labeled as a peak sad emotional reaction, and respective peaks 58 and 70 may be labeled as a peak regretful emotional reaction.

Figure 3B:
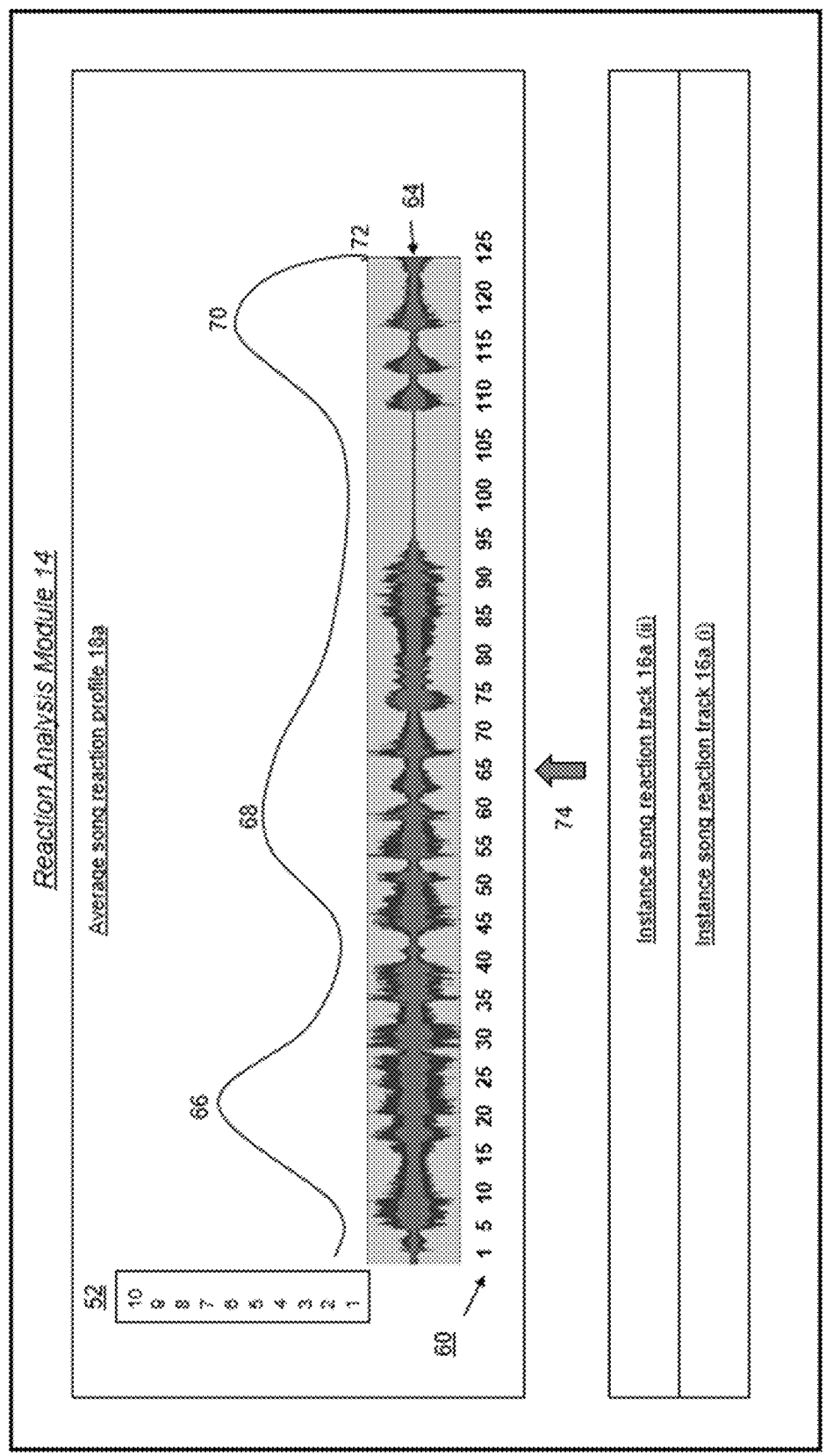
FIG. 3B illustrates an exemplary reaction analysis module interface and an alternative exemplary average reaction song profile of the FIG. 1 embodiment.

As a specific, non-limiting example, the mood hypothesis module 36 may be configured to compare the exemplary ERT 16a (iii) of FIG. 2 with the average song reaction profile 18a of FIG. 3B to evaluate how intensity levels 52 from a most current listen of song (a) by user 12 differ from previous average intensity levels 52 (reflected by the initial average song reaction profile 18*a* of FIG. 3B). Where the intensity levels reflected in the most current ERT (e.g., 16*a* (iii) in FIG. 2) notably differ from the initial average song reaction profile (e.g., 18*a* of FIG. 3B) intensity levels, the mood hypothesis module 36 may communicate to the system 10 a prediction or hypothesis that a mood change has occurred in user 12 between, temporally speaking, the user's previous engagements with the system 10 and the present moment. Exemplary logic for predicting/hypothesizing a mood change may include the following:

If: $(MI_o)a \ldots x \!>\!> (EI_c)a \ldots x$ or $(MI_o)a \ldots x \!<\!< (EI_c) a \ldots x$ Then: Hypothesize mood change has occurred And: Adjust mood hypothesis.

Alternatively, if: $(MI_o)a \ldots x \geq (EI_c)a \ldots x$ or $(MI_o) a \ldots x \leq (EI_c)a \ldots x$ Then: Hypothesize mood change has not occurred And: Do not adjust mood hypothesis.

With the aforementioned, non-limiting example exemplary logic, $(MI_o)$ refers to an initial mean intensity level of emotion at a particular peak among peak numbers a to x before the most current song listen. It will be apparent to one of ordinary skill in the art that there may be any number of different emotion intensity peaks and/or troughs in an exemplary ERT and/or average song reaction profile without departing from the scope of the present invention.

In the aforementioned example, $(EI_c)$ refers to a current intensity level of an emotion at a particular peak among peak numbers a to x during the most current song listen. If a particular peak (among peak numbers a to x) in the most current ERT has a notably lower ($>\!>$) or higher ($<\!<$) emotion intensity level than the corresponding peak (among peak numbers a to x) in the initial average song reaction profile, the system 10 may hypothesize that a mood change has occurred, and adjust the mood hypothesis accordingly, as described in more detail below. If a particular peak (among peak numbers a to x) in the most current ERT has a negligibly lower ($>$) or higher ($<$) emotion intensity level compared to the corresponding peak (among peak numbers a to x) in the initial average song reaction profile, or a substantially equal ($=$) emotion intensity level compared to the corresponding peak (among peak numbers a to x) in the initial average song reaction profile, the system 10 may hypothesize that a mood change has not occurred, and refrain from adjusting the mood hypothesis.

It will be apparent to one of ordinary skill in the art that the aforementioned exemplary logic is merely illustrative of an exemplary embodiment, and is in no way exhaustive of the scope of the present invention. It will further be apparent to one of ordinary skill in the art that thresholds for defining notable versus negligible emotion intensity level differences may vary in any number of different magnitudes without necessarily departing from the scope of the present invention. It will additionally be apparent to one of ordinary skill in the art that although it may be advantageous to have mood hypothesis data (e.g., illustrated in FIG. 4) displayed in a user-viewable medium, such is not necessarily required.

An exemplary mood hypothesis may comprise a field of data (e.g., illustrated in mood hypothesis adjustment framework 78 data table of FIG. 4) representing predictions about a user's 12 emotions experienced before and after the user 12 experiences a media element. The mood hypothesis may change after each instance the user experiences a media element. By way of example and not limitation, changes 28 in average song reaction profiles (e.g., 18*a*) may cause changes to the field of data (e.g., 75, 76, 77). Although the FIG. 4 embodiment illustrates a mood hypothesis field of data displayed by an interface of the reaction analysis module 14, such is not necessarily required. By way of example and not limitation, if one or more particular peaks in the most current ERT have notably higher emotion intensity levels than the corresponding peak(s) in the initial average song reaction profile, the mood hypothesis module 36 may hypothesize that emotions labeled at said one or more particular peaks are more likely to be currently experienced by the user, part of the user's current mood, currently resonating most with the user, or the like.

As an illustrative, non-exhaustive example, where the system 10 is confident that a user is likely to be currently experiencing a particular emotion (e.g., based on significantly higher emotion intensity levels for an indicated emotion in the most current ERT compared to the initial average song reaction profile), the system 10 may assign a high probability measure next to that emotion in the mood hypothesis field of data, and/or may increase an existing probability measure. Where the system 10 is confident that a user is not likely to be currently experiencing a particular emotion (e.g., based on significantly lower emotion intensity levels for an indicated emotion in the most current ERT compared to the initial average song reaction profile), the system may assign a low probability measure next to that emotion in the mood hypothesis field of data, and/or may decrease an existing probability measure. Where the system lacks confidence as to whether a user is likely or not to be currently experiencing a particular emotion (e.g., based on negligible change in emotion intensity levels for an indicated emotion in the most current ERT compared to the initial average song reaction profile), the system may assign an intermediate probability measure next to that emotion in the mood hypothesis field of data, and/or may refrain from adjusting an existing probability measure.

In the illustrative embodiment of FIGS. 2 and 3B, the first two peaks (54 and 56, which may be represented by the emotion labels "heartbroken" and "sad," respectively) of the instance song reaction track 16*a* (iii) may be elevated with respect to (higher than) the corresponding peaks 66 and 68 of the initial average song reaction profile 18*a*. The third peak (58, which may be represented by the emotion label "regretful") of the instance song reaction track 16*a* (iii) may be lower than the corresponding peak 70 of the initial average song reaction profile 18*a*. An exemplary system may be configured to document and store all data reflecting all changes (and magnitudes thereof) between initial average song reaction profiles and subsequent ERTs, wherein said changes may contribute to changes 28 in the average song reaction profile (e.g., 18*a*) (e.g., may assist the exemplary system in hypothesizing that playing certain songs sequentially in the future may adjust the user's mood). The aforementioned data may be stored on a database of the mood hypothesis module, although such is not required.

As a specific, non-limiting example of an exemplary mood hypothesis, the mood hypothesis adjustment framework 78 table of FIG. 4 illustrates emotions (e.g., sad, happy elated, heartbroken, angry, regretful) having an assigned, predicted probability in the form of a percentage that the user 12 is currently experiencing them. Thus, generally speaking, the mood hypothesis may reflect system 10 prediction of a user's mood over time. The FIG. 4 emotion labels, and the number of emotions listed are merely illustrative, and are in no way exhaustive of the scope of the present invention. It will also be apparent to one of ordinary skill in the art that predicted probabilities may be expressed through other metrics other than percentages without departing from the scope of the present invention.

In this particular embodiment, current mood hypothesis percentages (e.g., for before the 16*a* (iii) ERT is factored into the mood hypothesis) may reflect user indicated information about the user's mood (e.g., for each new system session, the user may manually input information about one's perceived current emotions through an interface of the mood hypothesis module 36) before or during the user's current engagement with the system 10. Alternatively, or additionally, current mood hypothesis percentages for before the 16*a* (iii) ERT is factored into the mood hypothesis may reflect system 10 assigned percentages based on the user's 12 recent reactions (e.g., explicit or implicit emotion assignment) to other songs. The use of media reactions for determining initial mood hypothesis may provide less subjective data than the aforementioned manually input information. As a specific, non-limiting example, the system 10 may be configured to only look to explicit or implicit emotion assignment data obtained within the last hour, if said data is available, and use said data to assign initial emotion probability percentages. It will be apparent to one of ordinary skill in the art that there may be any number of different methods for assigning current mood hypothesis emotion probabilities without necessarily departing from the scope of the present invention.

In this particular embodiment, after the 16*a* (iii) ERT is generated, the mood hypothesis may be adjusted accordingly (e.g., 75, 76, 77). Here, where the first two peaks 54 and 56 of the 16*a* (iii) ERT are represented by the emotion labels "heartbroken" and "sad," respectively, and said peaks are elevated with respect to the corresponding peaks 66 and 68 of the initial average song reaction profile (18*a* in FIG. 3B), the system 10 may be directed to increase 75, 76 the probability that the user is experiencing heartbroken and sad emotions during/after the 16*a* (iii) listen. Here, where the third peak 58 of the 16*a* (iii) ERT is represented by the emotion label "regretful," and said peak is lower than the corresponding peak 70 of the initial average song reaction profile (18*a* in FIG. 3B), the system 10 may be directed to decrease 77 the probability that the user is experiencing a regretful emotion during/after the 16*a* (iii) listen. The aforementioned probability increases and decrease may be considered herein to be illustrative, non-limiting examples of "mood hypothesis refining." Mood hypothesis refining may involve adjusting the mood hypothesis each time a new instance media reaction track/emotion reaction track (ERT) is generated. By way of example and not limitation, where one of a user's emotion intensity peaks is muted, the system 10 may find an emotion hypothesis comprising an emotion label associated with said intensity peak and decrease the probability that the user is experiencing the emotion represented by said emotion label. Where one of a user's emotion intensity peaks is elevated, the system 10 may find an emotion hypothesis comprising an emotion label associated with said intensity peak and increase the probability that the user is experiencing the emotion represented by said emotion label.

The magnitude of the aforementioned probability increases, and decrease may be determined by the system 10 assessing the relative magnitude of the increases and decrease in most current ERT peaks (54, 56, 58) compared to the initial average song reaction profile peaks (66, 68 and 70). The system 10 may be directed to increase an emotion probability percentage (e.g., labeled as "after 16*a* (iii) listen probability" in FIG. 4) to a percentage closer to 100% when the initial average song reaction profile peak is low (e.g., on the emotion intensity scale 52), and the corresponding most current ERT peak is high (e.g., on the emotion intensity scale 52). By way of example and not limitation, the system 10 may predict that a user is experiencing a particular emotion (e.g., based on the song playing) when there is an elevated intensity peak labeled with said emotion. Likewise, the system 10 may be directed to decrease emotion probability percentage to a percentage closer to 0% when the initial average song reaction profile peak is high (e.g., on the emotion intensity scale 52), and the corresponding most current ERT peak is low (e.g., on the emotion intensity scale 52).

Where an emotion label is present in the initial average song reaction profile, but not the most current ERT, the system may be directed to decrease the emotion probability percentage to a percentage closer to 0%. Where an emotion label is neither present in the initial average song reaction profile nor the most current ERT, the system may be directed to assign a probability closer to 0% for both the before and after listen emotion probabilities (e.g., emotion probability percentages). Where an emotion label is notably present in the most current ERT, but is not present in the initial average song reaction profile, the system may be directed to assign a probability closer to 100% for that particular emotion. The system 10 may focus on peak data and may ignore feedback related to low intensity emotions while adjusting the mood hypothesis, although such is not required. It will be apparent to one of ordinary skill in the art that there may be any number of different methods available for adjusting and regulating an exemplary mood hypothesis based on media reaction track data without departing from the scope of the present invention.

At least one database of an exemplary system 10 may be configured to store historic data related to the mood hypothesis adjustment framework 78 to, by way of example and not limitation, permit system 10 monitoring of the mood hypothesis over time. Where significant repeated decreases and/or sustained lulls over time are identified for a particular emotion, the system 10 may be less likely to assign a high percentage for that emotion when, e.g., the user begins a new system session. Where significant repeated increases and/or sustained highs over time are identified for a particular emotion, the system 10 may be more likely to assign a high percentage for that emotion when, e.g., the user begins a new system session.

The reaction analysis module 14 may be configured to communicate instance media reaction track and average media reaction profile data to other software modules (e.g., 36, 38) for determination of preferred media to offer to the user 12. The system 10 may look to average media reaction profiles of all users, or all users within a subset of users, such as those with kindred personality profiles (e.g., stored to system database 44) for a particular media element, and assign the most common emotions marked at high intensities to a "user-wide average media reaction profile" for the media element (reflecting all instance media reaction tracks from all users). The system 10 may likewise look to all average media reaction profiles of a particular user (e.g., 12) for all media elements experienced by that user, and identify which emotions (and at which intensities) are most commonly expressed by that user.

The system 10 may recommend subsequent media to the user based on the subsequent media having a user-wide average media reaction profile that includes emotions marked at high intensities similar to the most common emotions at high intensities expressed by the user. Alternatively, or additionally, the system 10 may recommend subsequent media to the user based on the subsequent media having a user-wide average media reaction profile substantially similar to one or more average media reaction profiles (e.g., 18a) of the user 12. An exemplary system may predict that subsequent media having an average media reaction profile similar to one or more average media reaction profiles of the user 12 may resonate well with the user 12, and elicit a strong emotional reaction (e.g., high intensity peaks in an ERT) from the user 12.

As a specific, non-limiting example, where average media reaction profiles are each expressed as one or more polynomial functions, similarity between different average media reaction profiles may be assessed according to the following exemplary logic:

$$D=\int_a^b f1(x)dx - \int_a^b f2(x)dx$$

In the above illustrative example equation, a first average media reaction profile extending from temporal point a to b may be represented by a polynomial function $f1$, and a second average media reaction profile extending from temporal point a to b may be represented by a polynomial function $f2$. Each polynomial function may represent an emotion intensity relationship over time based on points factored into the average media reaction profile. The above example equation may provide an exemplary system (e.g., 10) with the difference D between the area below each average media reaction profile curve. Where the difference D is a number close to zero, the first and second average media reaction profiles may be considered to be similar. Where the difference D is a number far from zero, the first and second average media reaction profiles may be considered to be dissimilar. The system 10 may require that each average media reaction profile comprises similar emotional labels for the aforementioned comparison to be executed, although such is not necessarily required. It will be apparent to one of ordinary skill in the art that an exemplary system is not necessarily limited to any particular technique for comparing average media reaction profiles, commonly expressed user emotion data, or the like.

Alternatively, or additionally, media may be recommended to a user based on reference to the user's mood hypothesis (e.g., percentages in FIG. 4), wherein media may be assigned to a queue 48 with an intention of achieving a target mood hypothesis, as described in more detail below. Alternatively, or additionally, media predicted to be enjoyed by/resonate well with the user 12 may be recommended, wherein the system 10 may identify media that has resulted in high intensity peaks with the user 12 or similar users (e.g., 42) before, and recommend said media to the user 12. The system may verify that the user's current mood hypothesis includes high emotion probabilities for emotions represented by high peaks in historic reaction data for said media before recommending said media to the user 12. It will be apparent to one of ordinary skill in the art that an exemplary system may employ any number of different methods for utilizing instance media reaction track data for recommending media without departing from the scope of the present invention.

Figure 5:
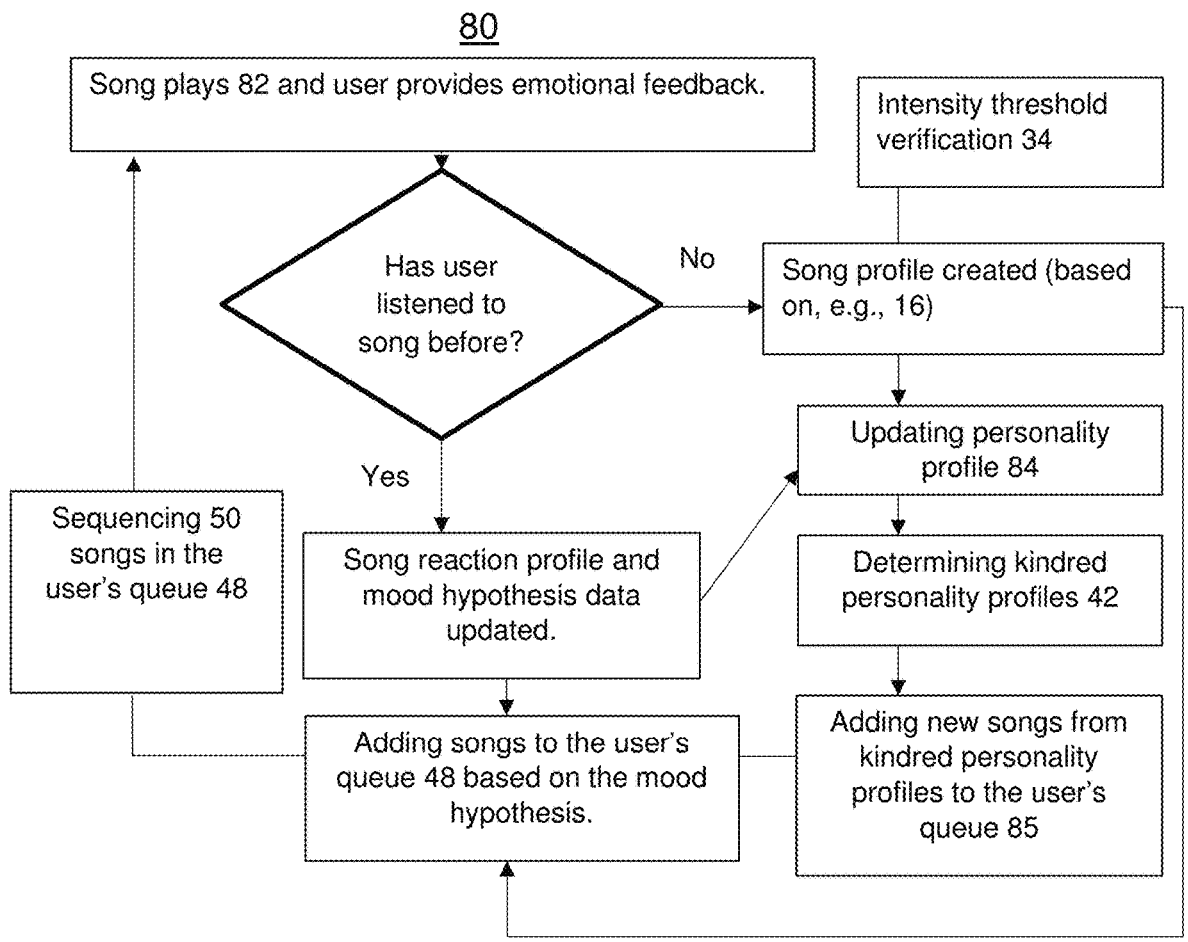
FIG. 5 illustrates exemplary logic of a preferred song recommendation system in accordance with an exemplary embodiment of the present invention.

FIG. 5 illustrates exemplary logic of a preferred system 80 where music is assigned to an exemplary queue 48 based on registered information about a user's current emotions (e.g., based on emotional reaction track data). In this particular embodiment, after a song plays 82 and a user provides emotional feedback for the song (alternatively or additionally, emotional feedback may be registered autonomously using sensors), the system 80 may determine whether the user has listened to the particular song before. Where the user has not listened to the particular song before, the system 80 may generate a song profile for the song including the first ERT (e.g., 16) for the song, wherein the ERT may be generated using explicit emotion assignment, implicit emotion assignment, some combination thereof, or the like. The system 80 may be configured to verify that the first ERT for the song exceeds a particular intensity (intensity threshold verification 34) before the song is considered for subsequent recommendation to the user, the ERT is factored into the current mood hypothesis, some combination thereof, or the like. Following song profile generation and intensity threshold verification 34, the system 80 may update a personality profile 84 for the user by assigning personality traits to the user's personality profile based on the user's registered emotional reactions.

Where the user has listened to the particular song before, the average song reaction profile for the particular song may be generated or updated, and mood hypothesis data for the user may be updated based on analysis of, for example not by way of limitation, differences in intensity peaks between the initial average song reaction profile and the ERT for the most current listen of the song. The system 80 may then update a personality profile 84 for the user by assigning to and/or revising personality traits in the user's personality profile based on the user's registered emotional reactions. By way of example and not limitation, where the user is commonly experiencing a particular emotion at high intensities at numerous points in numerous songs, the system 80 may assign the tendency to experience that particular emotion as a personality trait in the user's personality profile. Where the user is never experiencing a particular emotion at high intensities at numerous points in numerous songs, the system 80 may assign the lack of experiencing that particular emotion as a personality trait in the user's personality profile. Personality traits may be listed in rows in a user's personality profile, but such is not required. It will be apparent to one of ordinary skill in the art that any number of different methods for analyzing media reaction data to predict personality traits may be employed without departing from the scope of the present invention.

The system 80 may compare predicted personality traits of the user with predicted personality traits of other users to determine which other users may have similar personalities to the user ("kindred personalities"), for, e.g., the purposes of potentially forming relationships (friendships, romantic relationships, acquaintanceships, some combination thereof, or the like) with one another. Kindred personality users may be referred to herein as having "kindred personality profiles." The system 80 may be configured to compare each user's personality profile with those of other users (e.g., other users may be limited to users in geographic proximity to the user), and determine kindred personality profiles 42 based on similarities in system-predicted personality traits, user-expressed personality traits, some combination thereof, or the like. It will also be apparent to one of ordinary skill in the art that exemplary personality traits are not necessarily limited to predicted emotional tendencies. By way of example and not limitation, where a user has high intensity, positive emotion reactions (e.g., high expressed happiness, elation, some combination thereof, or the like) in response to dark comedy or other dark media, an exemplary system may label the user as having a dark sense of humor.

All songs from a first kindred personality profile queue, favorable reaction list, strong emotional reaction list, some combination thereof, or the like, assuming said songs are not already assigned to the queue 48 of a second kindred personality, may be added 85 to the queue 48 of the second kindred personality based on a prediction that media resonating well with one kindred personality will also resonate well with another kindred personality.

Certain songs among said songs predicted to help achieve, maintain, enhance or the like a target mood, described in more detail below, may be prioritized in the queue 48 according to exemplary sequencing 50 of songs in the queue 48. Certain songs among said songs predicted to not help achieve, maintain, enhance or the like a target mood, described in more detail below, may not be assigned to the queue 48 or may be assigned low priority within the queue 48 according to exemplary sequencing 50 of songs in the queue 48. Exemplary sequencing 50 may also involve the system 80 prioritizing songs the user's queue 48 historically associated with high intensity emotions (e.g., reflected by peaks in ERTs and average song reaction profiles) similar to high probability emotions in the user's current mood hypothesis.

Exemplary sequencing 50 may further involve prioritizing songs in the user's queue 48 that have been associated with achievement, maintenance, enhancement or the like of a target mood on multiple occasions. It will be apparent to one of ordinary skill in the art that there may be any number of different methods for sequencing songs in an exemplary queue without departing from the scope of the present invention. A song prioritized at the top of a user's queue 48 according to exemplary sequencing 50 may be directed to play 82 next, and the user may provide emotional feedback therefor. The system 80 may generate an ERT or update an average song reaction profile accordingly, and continue with the exemplary FIG. 5 process thereafter. It will be apparent to one of ordinary skill in the art that the specific steps illustrated and described in FIG. 5 are in no way exhaustive of the scope of the present invention.

Each time a user 12 initiates a new system session, the queue may start off where it left off during the last system session, such that the next song assigned to play during the last system session is the first song to play during the new system session, although such is not required (e.g., the user may also have the option to select songs independent of queue priority, and may exercise this option at the beginning of a new system session). The system 80 may predict at the onset of a new system session that the user is in a similar mood as the user was the last time the user exited the system 80. By way of example and not limitation, the system 80 may incorporate the mood hypothesis data present when the user last exited the system 80 as the current mood hypothesis data before the user experiences subsequent media during the new system session (and, e.g., instance media reaction tracks are then generated accordingly, and the mood hypothesis is then adjusted accordingly).

After the user experiences subsequent media during the new system session, the queue 48 may be adjusted according to an exemplary objective of testing whether the initial mood hypothesis still represents the user's current mood (and if not, the mood hypothesis may be adjusted accordingly, and the queue 48 of recommended media may be adjusted 50 to be compatible with the mood hypothesis), meeting a target mood, as described in more detail below, some combination thereof, or the like. As a specific, non-limiting example where the queue 48 involves songs, songs predicted to have a high probability of meeting the mood hypothesis (songs identified with high emotion peaks similar to the user's current predicted emotions) may be moved up in the queue 48. When a user's emotion intensity levels trend down over time, a greater variety of new songs (ones without an existing ERT for the user) may be recommended to the user to, e.g., evaluate if and how desired emotion probabilities may be increased in the mood hypothesis. An exemplary system 80 may also be configured to provide a user with a variety of songs with contrasting emotion labels to determine if doing so elicits a positive emotional response in the user. The system 80 may be directed to refrain from providing a variety of songs with contrasting emotion labels further if doing so is revealed to result in undesired mood hypothesis adjustments.

In an exemplary embodiment, as the initial mood hypothesis changes based on, e.g., mood hypothesis refining, the system may be directed to recommend and/or prioritize songs accordingly. By way of example and not limitation, where historic mood hypothesis data, average song reaction profile data, ERT data, and the like suggests that a particular song tends to elicit a particular emotion in a user when the user is in one's current mood as predicted by the program's mood hypothesis, the particular song may be recommended to the user and/or prioritized within the user's queue 48 when the user indicates that the user desires to feel that particular emotion. It will be apparent to one of ordinary skill in the art that exemplary sequencing and media recommending is not necessarily limited to embodiments illustrated and described herein, and may involve any number of different devices or methods without departing from the scope of the present invention.

In certain embodiments, songs identified from a queue, listen history, favorable emotional response data, or the like of a kindred personality may be prioritized in the user's queue 48 after being recommended to the user, but such is not required. Priority may also be assigned to songs predicted to increase emotion probabilities for emotions identified by the user as being target emotions. Where the user desires to maintain the user's current mood, the system 80 may prioritize songs identified with maximum intensity peaks having emotions labels similar to the user's current high probability emotions.

Since a user may become less likely to have strong emotional reactions to a media element when the user experiences the media element many times in close temporal proximity, an exemplary system 80 may seek to present the user with an ever-expanding number of media elements (e.g., to avoid desensitization due to overfamiliarity). An exemplary method for presenting the user with an ever-expanding number of media elements involves continuously adding media elements suggested from each of an expanding number of kindred personality profiles to the user's queue 48.

The system 80 may predict that a user will have a stronger emotional reaction to any song when a significant amount of time has passed since the user last listened to the song. For each song in the user's queue 48 the user has previously listened to, the system 80 may track how much time has passed since the user last listened to the song. The amount of time that has passed may be expressed on an exemplary song profile. The system 80 may be configured to verify that a minimum amount of time has passed since the user last listened to each song before each song is permitted to reach the top of the user's queue 48. Although said minimum amount of time may preferably be dynamically and autonomously set by the system 80 itself, said minimum amount of time may alternatively, or additionally, be specified as a specific amount of time by a system 80 administrator and/or user without departing from the scope of the present invention.

Alternatively, or additionally, the system 80 may also be configured to estimate an ideal minimum amount of time required to pass before each song is permitted to reach the top of the user's queue 48 based on machine learning. By way of example and not limitation, where a user expresses an intensity level of 5 for a particular peak after three days have passed between listens of a particular song, an intensity level of 7 for a particular peak after four days have passed between listens for the particular song, and an intensity level of 9 for a particular peak after five days have passed between listens for the particular song, the system 80 may assign five days as the ideal amount of time required to pass (may also be referred to herein as "ideal emotional intensity interval" before the particular song may be played again after having been played.

Where it is determined that estimated ideal emotional intensity intervals are no longer resulting in high intensity peaks, are resulting in an undesired mood-hypothesis, some combination thereof, or the like, the system 80 may be directed to adjust the ideal emotional intensity interval to a default number (e.g., one day), adjust the ideal emotional intensity interval in decrements or increments (e.g., one day decrements or increments), or the like until desired emotional reactions are achieved. The system 80 may also be configured to delay playing songs predicted to be inconsistent with a target mood. By way of example and not limitation, where a user has historically had significantly lower emotional reaction intensity levels for a particular song when the mood hypothesis suggested the user was sad, and has historically had significantly higher emotional reaction intensity levels for a particular song when the mood hypothesis suggested the user was happy, and the current mood hypothesis suggests the user is sad, the system 80 may delay playing that particular song until the mood hypothesis no longer suggests the user is sad. It will be apparent to one of ordinary skill in the art that there may be any number of different methods employed for regulating time delays between subsequent media plays without departing from the scope of the present invention.

Referring now to FIGS. 1 and 5, intensity threshold verification 34 may specifically involve a requirement that an intensity peak in an instance media reaction track exceeds a particular level on an intensity scale ("intensity threshold") for the media element to be considered for subsequent plays, for the instance media reaction track to be factored into the mood hypothesis, some combination thereof, or the like. The intensity threshold may be predefined by a system administrator, determined by machine learning, some combination thereof, or the like. By way of example and not limitation, the intensity threshold may be the average intensity level on an intensity scale of all the user's 12 emotional feedback. In this particular non-limiting example, only songs having a peak exceeding the user's 12 average intensity level of emotional feedback may be considered for subsequent plays, for mood hypothesis adjustment, some combination thereof, or the like. Additionally, or alternatively, intensity threshold verification may involve verifying that an area under an emotional response curve exceeds a minimum threshold area. Area under an emotional response curve may be determined, e.g., by integrating a function representing the curve.

It will be apparent to one of ordinary skill in the art that any number of different methods for intensity threshold verification may be employed without necessarily departing from the scope of the present invention. By way of example and not limitation, intensity threshold verification may also take into consideration a target mood, the number of media elements currently available for recommendation (and whether this number should be increased to improve overall user experience), trends in the mood hypothesis, some combination thereof, or the like. An exemplary system (e.g., 10, 80) may adjust the intensity threshold when doing so is predicted to positively impact the mood hypothesis. Intensity threshold verification 34 is illustrated in FIG. 1 as occurring under a reaction analysis module 14, but such is not required.

An exemplary system (e.g., 10, 80) may involve communication of media to users by way of any number of different computer readable mediums. Exemplary logic of the system (e.g., 10, 80) may be executed according to an exemplary software application comprising any number of different modules. By way of example and not limitation, an exemplary system and its corresponding method may be implemented using JAVA, CGI script, Python, some combination thereof, or the like. It will be apparent to one of ordinary skill in the art that any number of different computing devices may be employed to execute exemplary software of the present invention. Computing devices, preferably adapted to run programming code and implement various instructions and/or functions of an exemplary system and its corresponding method, may include by way of example and not limitation, processors, microprocessors, microcontrollers, embedded processors, DSP, some combination thereof, or the like. Exemplary software may be stored on an electronic storage medium, and executed with the cooperation of a controller and memory. Computing and display devices such as smart phones, other smart devices, desktop computers, tablets, some combination thereof, or the like may be employed to both execute and display aspects of an exemplary embodiment.

An exemplary software display device may include by way of example and not limitation, a screen, a configurable area thereof, gesture capture regions, any number of screen sensors, a camera, some combination thereof, or the like. An exemplary user computer device adapted to permit the user to interact with an exemplary system may be in electronic communication with a system database adapted to store data from all users, one or more control computing devices adapted to regulate the system as a whole, other user computer devices, some combination thereof, or the like. It will be apparent to one of ordinary skill in the art that there may be any number of different devices or methods available permitting users to interact with an exemplary system, and to further interact with one another without departing from the scope of the present invention.

In an exemplary embodiment, a user may only interact with the system (e.g., 10, 80) after the user enters an approved username and password. User access and user roles may be defined based on any number of different methods to regulate the level of access certain users have with respect to one another.

An exemplary system (e.g., 10, 80) may also assign emotion labels to a media element to be potentially recommended to a user based on any number of different descriptions of the media element from any number of different sources. By way of example and not limitation, information about a song from social media, one or more song reviews, some combination thereof, or the like may be utilized for assigning emotional labels to a media element. An exemplary system (e.g., 10, 80) may test whether one or more emotional labels assigned to a media element are accurate by verifying with a user that a given media element elicits a predicted emotional reaction with them. By way of example and not limitation, when user 12 is presented with a song predicted to be a sad song, the system 10 may confirm this prediction when the user 12 selects an option that the song elicits a sad emotional reaction. The aforementioned recommendation technique may be advantageous where the system (e.g., 10, 80) has determined that there are few media elements in the user's queue 48, additional media to recommend based on emotional feedback is limited based on repeated instances of intensity threshold verification failure, some combination thereof, or the like, and alternative mechanisms for recommending songs are needed.

Figure 6:
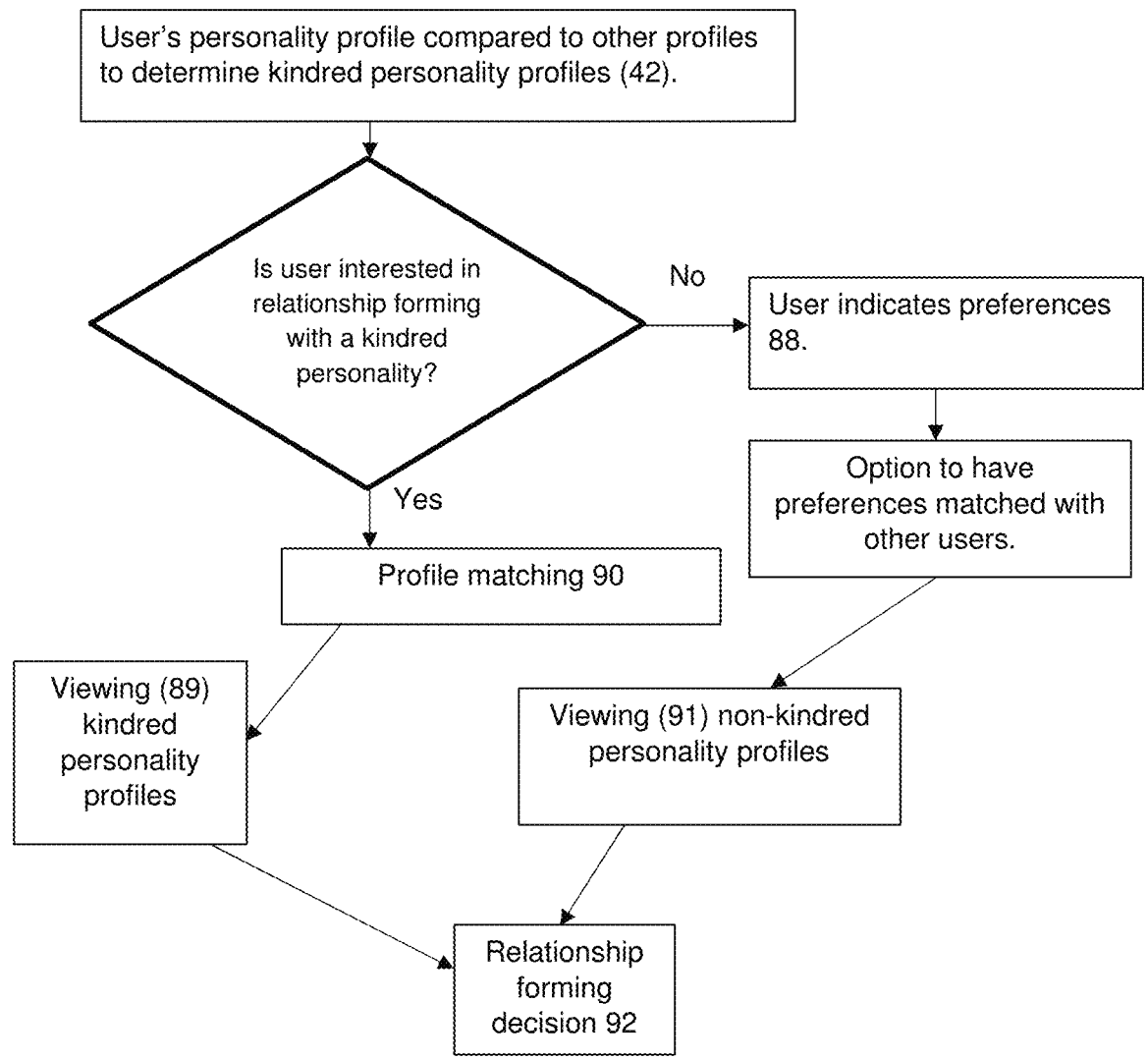
FIG. 6 illustrates exemplary logic of a preferred personality profile matching system in accordance with an exemplary embodiment of the present invention.

Referring to FIGS. 6-8, exemplary logic 86 for permitting users to form relationships with one another is shown. A first user's personality profile may be compared with any number of other personality profiles to determine kindred personality profiles 42. An exemplary system may assess which other users have like personality traits with respect to the first user to determine which other users are kindred personality users with respect to the first user. Like traits may include similar average media reaction profiles, similar historical mood hypothesis data, similar indicated hobbies and/or interests, geographic proximity to one another, some combination thereof, or the like.

It will be apparent to one of ordinary skill in the art that personality profile data (e.g., 96) is not necessarily limited to system personality trait predictions based on emotional response feedback of the user, and any number of different types or categories of information about a user may be incorporated into a personality profile without necessarily departing from the scope of the present invention. By way of example and not limitation, personality profile information available for various users (e.g., 94) may include the name of the user (and/or other user identification information), the user's age, religion, the user's interest and/or hobbies, pictures of the user, some combination thereof, or the like.

After the system determines kindred personality users with respect to the first user (e.g., User A), the user may be permitted to communicate to the system whether the user is interested in forming a relationship (e.g., dating, forming a friendship, forming an acquaintanceship, some combination thereof, or the like) with one or more kindred personalities. Where the user communicates to the system that the user is interested in forming a relationship with one or more kindred personalities, the system may specifically recommend kindred personality profiles to the user (profile matching 90) for the user to view 89 and consider (e.g., by viewing pictures, looking at religious affiliations, interests and hobbies, approximate geographic location, some combination thereof, or the like).

Any number of different actions may be available to a user for communicating whether the user is interested in forming a relationship with another kindred personality. By way of example and not limitation, where a user is provided with a potential personality match by an exemplary system, the user may swipe a first direction on a touch screen interface to communicate to the system that the user is interested in interacting with the kindred personality user to potentially form a relationship therewith. Where the user is not interested in interacting with a kindred personality user, the user may wipe a second direction on the touch screen interface to communicate one's lack of interest to the system in the other kindred personality user. Approximate geographic location may be determined by one or more global positioning systems (GPSs) for communicating to an exemplary system whether two kindred personality users are in close proximity to one another. If two users each indicate that they are interested in one another, the system may provide each user with an option to contact the other, and the users may decide to meet one another (e.g., may send one another meeting proposals) and/or form a relationship (relationship forming decision 92).

Where the user communicates to the system that the user is not interested in forming a relationship with one or more kindred personalities, the user may still have an option to indicate 88 one's preferred personality traits of people the user may eventually be interested in forming a relationship with. The user may also have the option to have the user's preferences analyzed for system determination of other users the user may eventually be interested in forming a relationship with, and the user may be able to view 91 personality profiles directed to the user based on the user's indicated preferences. It will be apparent to one of ordinary skill in the art that there may be any number of different mechanisms for system users to view one another's information and reach out to one another without departing from the scope of the present invention.

An exemplary system may predict that for a media element a first kindred personality has a strong emotional reaction to, a second kindred personality will also have a strong emotional reaction thereto, and the second kindred personality will have an instance media reaction track for that element similar to the first kindred personality's average media reaction profile. The system may test the aforementioned prediction by way of one or more aforementioned reaction track/profile similarity determination techniques (e.g., comparing number, magnitude and labels of intensity peaks). Where the system determines that similarity is high, the media element may be assigned high priority in the second kindred personality's queue. The system may also be configured to assign a kindred personality score between users based on, e.g., similar emotional reactions to media or lack thereof between users, whether or not media recommended from the first kindred personality to the second kindred personality by the system tends to elicit a strong emotional reaction with the second kindred personality, some combination thereof, or the like. The first kindred personality may be able to view one's kindred personality score with the second kindred personality, and vice versa, to determine whether each may be a quality match for the other in terms of forming a relationship.

Emotions associated with lower or frequently decreased (e.g., between a most current ERT and an average song reaction profile) intensity peaks may be discarded before media is recommended from one kindred personality to another. It will be apparent to one of ordinary skill in the art that there may be any number of different methods available for recommending media between kindred personality users and for recommending kindred personality users to users of an exemplary system for, e.g., relationship-forming purposes without necessarily departing from the scope of the present invention.

Referring specifically to personality profile 96 data in FIG. 8, an exemplary system may compare intensity levels for various emotions between various users (e.g., users A-C personality profiles, or users A-C PPs). Said comparison may be substantially displayed on an exemplary table of a user interface, and said table may include song profile 18 data and user information (e.g., user ID for users A-C). It will be apparent to one of ordinary skill in the art that there may be any number of different methods available for organizing personality profile data without departing from the scope of the present invention.

FIGS. 7-22 illustrate, generally speaking, exemplary organization of system data objects and relationships thereof. It will be apparent to one of ordinary skill in the art that the aforementioned figures are merely illustrative, and there may be any number of different mechanisms available for storing, organizing, communicating, displaying, some combination thereof, or the like relevant data objects and relationships thereof without necessarily departing from the scope of the present invention. Generally speaking, FIGS. 7-8 illustrate exemplary personality profile data, FIGS. 9-16 and 20-22 illustrate exemplary ERT and average song reaction profile (abbreviated therein as "SP") data, FIG. 17 illustrates exemplary song profile data, and FIGS. 18-19 illustrate exemplary mood data.

Referring specifically to FIG. 9, a number of song profiles 18 for two users (users A and C) of an exemplary system include average song reaction profile data (e.g., number and magnitude of intensity peaks). A user may be permitted to toggle between viewing each ERT for each average song reaction profile. Referring now to FIGS. 9 and 14, intensity peaks 32 (IP1-3) in a first emotional reaction track 16 (ERT1) for User A, song A may include a number of different intensity levels each associated with a user emotion at a particular location in time during song A. Referring to FIGS. 9 and 15, intensity peaks 32 (IP1-3) in a second emotional reaction track 16 (ERT1) for User A, song C may also include a number of different intensity levels each associated with a user emotion at a particular location in time during song C. Referring to FIGS. 9 and 16, intensity peaks 32 (IP1-3) in a third emotional reaction track 16 (ERT3) for User A, song D may include a number of different intensity levels each associated with a user emotion at a particular location in time during song D.

FIG. 10 illustrates all ERTs 16 for User A, and includes intensity peak data 32 thereof. ERTs may be generated using exemplary explicit emotion assignment, implicit emotion assignment, some combination thereof, or the like. Each subsequent ERT may be added for each song after any number of different lengths of time have passed. Referring to FIGS. 9-11 and 14-16, ERTs may be averaged to form average song reaction profiles (e.g., SP1-3). FIG. 11 illustrates intensity peaks 32 for an average song reaction profile 18 for User A, song A. Here, the average song reaction profile 18 may be an average of ERT1-3 for song A. The intensity peaks 32 (IP1-3) may include a number of different average intensity levels each associated with a user emotion at a particular location in time during song A. FIG. 12 illustrates intensity peaks 32 for an average song reaction profile 18 for User A, song C. Here, the average song reaction profile 18 may be an average of ERT1-3 for song C. The intensity peaks 32 (IP1-3) may include a number of different average intensity levels each associated with a user emotion at a particular location in time during song C. FIG. 13 illustrates intensity peaks 32 for an average song reaction profile 18 for User A, song D. Here, the average song reaction profile 18 may be an average of ERT1-3 for song D. The intensity peaks 32 (IP1-3) may include a number of different average intensity levels each associated with a user emotion at a particular location in time during song D.

FIG. 20 illustrates intensity peaks 32 for an average song reaction profile 18 for User C, song A. Here, the average song reaction profile 18 may be an average of multiple ERTs for User C, song A. The intensity peaks 32 (IP1-3) may include a number of different average intensity levels each associated with a user emotion at a particular location in time during song A. FIG. 21 illustrates intensity peaks 32 for an average song reaction profile 18 for User C, song B. Here, the average song reaction profile 18 may be an average of multiple ERTs for User C, song B. The intensity peaks 32 (IP1-3) may include a number of different average intensity levels each associated with a user emotion at a particular location in time during song B. FIG. 22 illustrates intensity peaks 32 for an average song reaction profile 18 for User C, song C. Here, the average song reaction profile 18 may be an average of multiple ERTs for User C, song C. The intensity peaks 32 (IP1-3) may include a number of different average intensity levels each associated with a user emotion at a particular location in time during song C.

Referring to FIGS. 10-11 and 18, in an illustrative, non-exhaustive example where User A listens to song A for a fourth time and a fourth ERT therefor is generated, and the intensity level for IP1 exceeds 6.77 in the fourth ERT, an exemplary system may be directed to increase the probability in User A's current mood hypothesis (e.g., table in FIG. 18) that the user is in a melancholy mood. The aforementioned increase may be proportional to the degree the intensity level increased for IP1 in the fourth ERT.

Referring to FIG. 17, song 46 data stored to an exemplary system may include title of the song, other identification information, source (e.g., hyperlink to the song), classification (e.g., whether the song is a form of live music, from an album, or the like), artist name, some combination thereof, or the like. Referring to FIGS. 18-19, an exemplary system may be configured to compare a user's current mood hypothesis with target mood data, wherein said target mood data may be specified by the user.

Figure 27:
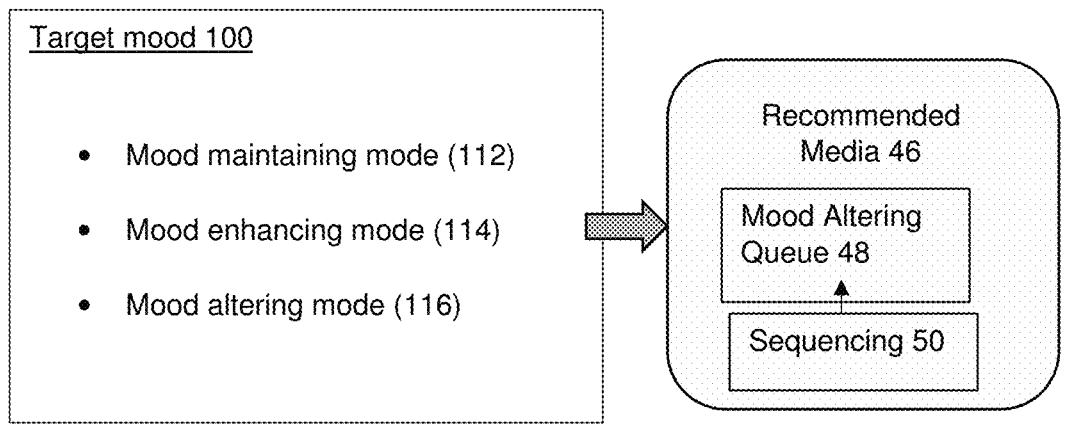
FIG. 27 illustrates exemplary logic for a mood-altering queue in accordance with an exemplary embodiment of the present invention.

Referring to FIGS. 18-19 and 27, a user may specify a target mood 100 the user wishes to attain (referred to herein as "explicit target mood selection"), and an exemplary system may recommend media (e.g., 46, involving mood altering queue 48 and exemplary sequencing 50 thereof) to the user accordingly. Options for specifying a target mood 100 may include by way of example and not limitation, various modes including a mode where the user specifies that the user wishes to maintain one's current mood (mood maintaining mode 112), a mode where the user specifies that the user wishes to enhance one's current mood (mood enhancing mode 114), and a mode where the user specifies that the user wishes to alter one's current mood to attain another mood (mood altering mode 116). As a specific, non-limiting example, where the user may be interested in songs for attaining melancholy and passionate emotions, the user may specify said interest according to an exemplary mode. Where a first user's current mood hypothesis reflects a high probability of melancholy and passionate emotions, and the first user sets target mood 100 to mood enhancing mode, an exemplary system may be directed to search for songs for recommendation with notable melancholy and passion levels indicated, including by way of example and not limitations, songs having peaks set by the first user labeled with melancholy and/or passionate emotion(s). An exemplary system may also search for one or more songs that a kindred personality user has labeled with high melancholy and or passion emotion intensity peaks, and direct said songs to the first user's queue.

Where, by way of example and not limitation, User A sets target mood 100 to mood altering mode 116, seeking to attain one or more different emotions not currently reflected by high probabilities in the mood hypothesis, an exemplary system may look to other media User A has labeled with strong emotional reactions, the emotions being similar or identical to the emotions User A currently seeks to attain, and recommend said media to User A. Alternatively, or additionally, an exemplary system may look to media (e.g., not already experienced by User A) labeled by kindred personality users with strong emotional reactions, the emotions being similar or identical to the emotions User A currently seeks to attain, and recommend said media to User A. Recommended media for mood altering mode 116 may preferably include at least some emotions reflected by User A's target mood 100. Where User A's target mood is hypothesized to have occurred, an exemplary system may revise the target mood 100 mode to mood maintaining mode 112. In mood altering mode 116, an exemplary system may only recommend media and/or sequences of media historically linked with significant changes to the mood hypothesis, but such is not necessarily required.

Where the current mood is set to mood maintaining mode 112, the system may attempt to maintain emotions with high probabilities in the current mood hypothesis assigned to the user. The system may attempt to do so by recommending media that has elicited a user emotional response resulting in a similar mood hypothesis before. In mood enhancing mode 114, the system may be configured to recommend media in an attempt to enhance probabilities in the current mood hypothesis, preferably regardless of what the current mood hypothesis is. The system may attempt to do so by recommending media that has elicited a user emotional response resulting in a stronger mood hypothesis before. Exemplary mood enhancing, maintaining and/or adjustment may each be achieved by sequencing songs based on historic mood shift and emotion detection data described above.

Where a target mood 100 is not specified, an exemplary system may be configured to predict a target mood by identifying the user's strongest emotional peaks and labels thereof, most listened to music, current mood hypothesis, some combination thereof, or the like. By way of example and not limitation, where the user's current mood hypothesis reflects negative emotions, the system may be configured to attempt to achieve a mood hypothesis with more positive emotions, and switch to mood maintaining mode once said mood hypothesis is achieved. It will be apparent to one of ordinary skill in the art that there may be any number of different methods for predicting a target mood when a target mood 100 is not otherwise specified without departing from the scope of the present invention.

Referring again to FIG. 23, a user may indicate target mood 100 on a user input 22 interface. The user may also indicate one's current mood 102 on the user input 22 interface. However, both target mood 100 and current mood 102 may also alternatively be predicted by the system absent or combined with user input 22 without departing from the scope of the present invention. By way of example and not limitation, in the FIG. 23 embodiment, an exemplary system is configured to predict the user's current mood 102 based on the user's song selections from the user input 22 interface.

Referring to FIG. 25, user information 106 stored to a system database 44 may include any number of different categories of information. In this particular embodiment, user information includes User ID, current mood hypothesis information, target mood information, personality profile information, a list of song profiles for the user, and a list of ERTs for the user.

Figure 26:
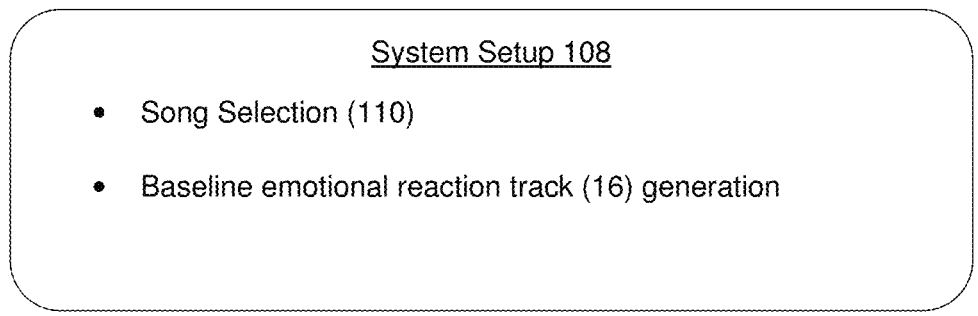
FIG. 26 illustrates an exemplary system setup interface of an exemplary embodiment of the present invention.

Referring to FIG. 26, a new user of an exemplary system may be directed to engage in system setup 108 before media recommendation may occur. A user may, by way of example and not limitation, advance system setup 108 by listing of as many songs (song selection 110) as the user remembers which the user believes strongly elicited an emotional reaction from the user. By way of example and not limitation, if a user recalls that a particular song resonates well with the user when the user is sad, the user may list said song in song selection 110. The user may also list one's favorite songs. The system may initially direct songs from song selection to the user's queue to obtain initial ERTs (baseline emotion reaction track (16) generation) for, e.g., subsequent song recommending, mood hypothesis determination and/or adjustment (e.g., initial mood hypothesis percentages may be determined during baseline emotion reaction track (16) generation by evaluating intensity peaks of initial ERTs), kindred personality profile determination, some combination thereof, or the like.

Referring to FIGS. 23-24, any number of different proxies (e.g., color, symbols, emojis, some combination thereof, or the like) may replace words for expressing emotional reactions to media (e.g., song 1). By way of example and not limitation, emotion intensity peaks may each be labeled with colors perceived to correspond with a user emotion (e.g., from the user learning to associate certain colors with certain emotions, overall mood, or the like over time). More prominent colors in a spectrum may be considered to correspond to a greater emotional intensity. Additionally, or alternatively, an exemplary system interface may include a color-based song selection option where a user may select a color (e.g., corresponding to the user's current mood) from a configurable area of the interface, and media may be recommended to the user accordingly (e.g., based on the user's perceived current mood). The user may be permitted to adjust which colors correspond to which emotions.

An exemplary system may be configured to predict a user's current mood 102 by permitting a user to select one or more songs from a navigable list of any number of different selectable song profiles. A selectable option of the navigable list may include, by way of example and not limitation, song title, color corresponding to a mood the song may tend to elicit, other emotion labels, some combination thereof, or the like. Based on a user's song selections, the system may estimate the current mood of the user, and/or where the song selections reflect emotion labels significantly contrasting with the current mood hypothesis, the system may predict the user seeks to attain a different mood (referred to herein as "implicit target mood selection"). Selected songs may also be assigned high priority in the user's queue, and may subsequently contribute to ERT generation as said songs are listened to, but such is not necessarily required (e.g., a user may have an option at any time to experience media without having to necessarily provide emotional feedback therefor).

In certain embodiments, options for each of explicit emotion assignment, explicit target mood selection, implicit emotion assignment, and implicit target mood selection may be toggled between on an interface (e.g., mood calibration dashboard). It will be apparent to one of ordinary skill in the art that the FIG. 23 interface is merely illustrative, and any number of different user interfaces may be employed without necessarily departing from the scope of the present invention.

It will be apparent to those of ordinary skill in the art that although it may be beneficial to recommend music labeled with positive emotions (e.g., happy, elated) to certain users, music labeled with negative emotions (e.g., sad, melancholy) may resonate better with other users depending on the mood of each user (e.g., when a certain user is depressed, music labeled with positive emotions like happiness may not resonate well with that user). Thus, in mood maintaining or enhancing mode, an exemplary system may still avoid recommending music having significant positive emotion intensity peaks if the mood hypothesis of the user reflects a high probability for negative emotions (e.g., where the user is feeling depressed). In an exemplary mood-altering mode, where a depressed user seeks to attain more positive emotions, the system may appreciate that the likelihood of the user's predominant emotional state changing from depressed to elated is unlikely (e.g., where no songs have proven effective at changing the user's predicted mood from depressed to elated), and may elect for a more gradual approach for helping the user attain more positive emotions.

By way of example and not limitation, the system may first focus on increasing the probability of melancholy emotions (as opposed to depressed emotions), followed by wistful emotions (as opposed to melancholy emotions), followed by elated emotions (as opposed to wistful emotions). As a specific non-limiting example, where historic data for song A indicates that song A tends to increase the probability of melancholy emotions, the system may direct song A to the top of the user's queue. Where historic data for song B indicates that song B tends to increase the probability of wistful emotions when the user has a high melancholy emotion probability, the system may direct song B to the top of the user's queue after the user's probability for melancholy emotions has increased. Where historic data for song C indicates that song C tends to increase the probability of elated emotions when the user has a high wistful emotion probability, the system may direct song C to the top of the user's queue after the user's probability for wistful emotions has increased. The aforementioned process may be a sequence to be assigned to a user in the user's queue. The aforementioned process may be evaluated for accuracy by an exemplary system, and may be corrected or refined as necessary to provide desirable results. Prioritizing sequences of media/groups of media may be performed according to any number of different methods (e.g., as opposed to merely recommending individual media). An exemplary system may attempt to attain a desirable target mood for a user by assigning media to the user's queue in sequences, and testing hypotheses for each sequence that the sequence will elicit a target mood's emotions at an elevated level. Where certain media proves ineffective for adjusting the mood hypothesis or achieving high emotion intensity reactions as intended, the system may continue to employ alternative options.

In mood altering mode, media showing historical effectiveness at adjusting a user's mood towards the target mood may be assigned top priority in the user's queue. Alternatively, or additionally, media showing historical effectiveness at adjusting kindred personality moods towards the target mood may be assigned priority in the user's queue. The system may be configured to assign media by exemplary sequence assignment as described above, and test hypotheses that the media promote transitioning towards a target mood. Historic data reflecting effectiveness of media at adjusting a user's mood and/or kindred personality moods may be represented by any number of different user interfaces, including by way of example and not limitation, data tables, graphs, heat maps, some combination thereof, or the like.

The frequency and duration of particular user moods may be tracked by an exemplary system through analysis of historic mood hypothesis data. By way of example and not limitation, where many periods of prolonged sadness or depression are predicted by an exemplary system, the system may tend to indicate the user may have a significant health issue that may need to be addressed (e.g., potential clinical depression to be evaluated and addressed accordingly by a medical professional). Likewise, by way of example and not limitation, where most of certain ERTs over a period of time involve very high intensity positive emotion peaks and most of other ERTs over another period of time reflect very high intensity negative emotion peaks, the system may tend to indicate the user may have a significant health issue that may need addressed (e.g., potential bipolar disorder to be evaluated and addressed accordingly by a medical professional).

Where an exemplary system detects that multiple subsequent instance media reaction tracks demonstrate lower than average emotion intensity peaks for a particular user, the system may be directed to employ mood enhancement mode. Whenever undesired trends in media reaction data occur, an exemplary system may be configured to test the effectiveness of varying media at counteracting said undesired trends. Additionally, where numerous instance media reaction tracks from a particular session involve abnormal intensity peak data, an exemplary system may be configured to discount the relevance of said data. Furthermore, where an exemplary system is determined to predict probability of certain emotions more effectively than others, the exemplary system may be directed to focus more on eliciting said certain emotions when recommending media. An exemplary system may also attempt to test whether a particular emotional reaction will occur during a session if said emotional reaction occurred in several recent, previous sessions. Where an exemplary system effectively promotes achievement of a target mood on many occasions over time, the exemplary system may have a meaningful impact on a user's overall emotional wellbeing.

Figure 28:
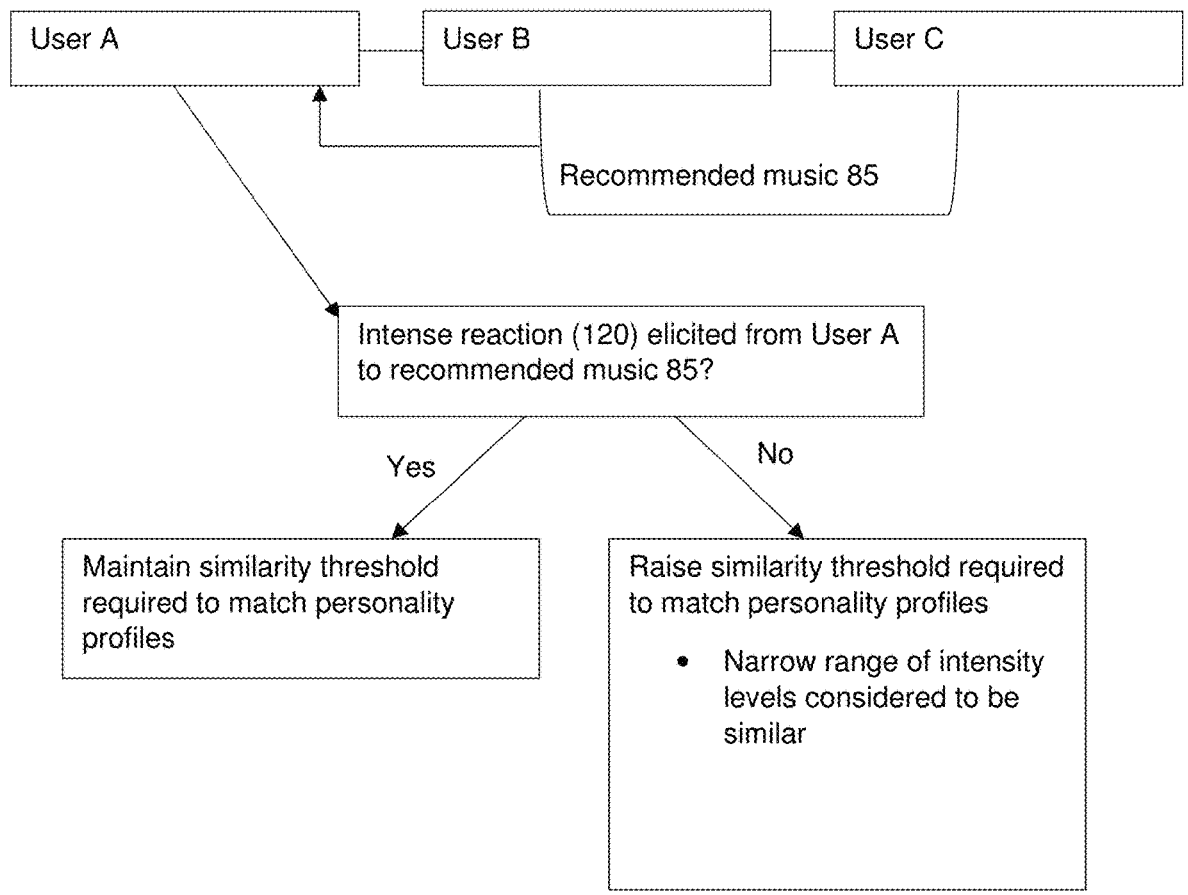
FIG. 28 illustrates exemplary machine learning in accordance with an exemplary embodiment of the present invention.

Referring to FIG. 28, exemplary machine learning 118 following kindred personality determination 42 is shown. An exemplary system may determine recommended music 85 from profiles of User B and C, and recommend said music 85 to User A. Where the user is determined by the exemplary system to have an intense reaction (120) to the recommended music 85, the system may maintain a similarity threshold (e.g., maintain the minimum kindred personality score) required to match personality profiles. Where the user is determined by the exemplary system to not have an intense reaction (120) to the recommended music 85, the system may raise a similarity threshold (e.g., increase the minimum kindred personality score) required to match personality profiles, narrow the range of intensity levels considered to be similar, some combination thereof, or the like.

Referring to FIGS. 1 and 29, implicit emotion assignment (e.g., involving sensor input 24 may involve associating a physiological/biological response of a user to sensory stimuli (e.g., a media element) with a perceived emotion. Exemplary implicit emotion assignment may include by way of example and not limitation, intensity imaging (e.g., video, pictures, or the like of the user) where imagery of a user is assessed by a computer to evaluate how a user physiologically reacts to a media element in a way that permits one or more processors to link emotions to the media element. Captured imagery may also be shared to the user's personality profile, although such is not required. It will be apparent to one of ordinary skill in the art that an exemplary system does not necessarily require a user to manually input any information about one's mood or emotions for the exemplary system to function. By way of example and not limitation, a user may elect for an exemplary system to utilize both implicit emotion assignment and/or implicit target mood selection as opposed to explicit emotion assignment and/or implicit target mood selection. The aforementioned implicit techniques of an exemplary system may permit the system to require less or no manual effort of the user. In certain exemplary embodiments, most or all exemplary functions of an exemplary system may be entirely automated and/or performed autonomously, and manual human input may be unnecessary for emotional reaction input, media recommendation, personality profile determination and comparisons, some combination thereof, or the like to occur (e.g., emotion label assignment, emotion intensity assignment, some combination thereof, or the like may be performed without any manual human input).

Exemplary implicit emotion assignment may also comprise automatic labeling of emotion intensity peaks by an exemplary system based on referencing data from other user profiles, although such is not required. It will be apparent to one of ordinary skill in the art that any number of emotion labeling methods, whether implicit and/or explicit, may be employed without necessarily departing from the scope of the present invention. It will also be apparent to one of ordinary skill in the art that a user may be permitted to add one's own music, request other personality profiles to view, some combination thereof, or the like without necessarily departing from the scope of the present invention.

Referring to FIG. 30, an emotion correction algorithm 122 for an exemplary system 10 is shown. A user may be presented with one or more emotions labeled to a media element currently being experienced by the user on a system interface. The emotions may correspond to emotions the system 10 predicts the user may be currently experiencing while being presented with the media element. Presented emotions may be in the form of a written label, color, or the like superimposed on a line, graph, or the like of an exemplary user interface. Where a prediction of the system 10 is not accurate, the user may communicate to the system (e.g., by swiping on a touch screen, selecting an arrow, selecting a key, some combination thereof, or the like) that the prediction is inaccurate, and alternative predictions may be expressed to the user. Where none of the alternative predictions match an emotion the user is experiencing, the user may communicate directly to the system which emotion(s) the user experienced.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A system for recommending media based on feedback from a user, the system comprising:
    a processor, configured with instructions to generate, during or after each instance the user experiences a first media element, a first plot demonstrating the user's emotional intensity reaction to the first media element over time;
    wherein the processor is further configured with instructions to generate a second plot demonstrating the user's average emotional intensity reaction over time to the first media element;
    wherein the processor is further configured to verify an intensity threshold of the user's emotional intensity reaction to the first media element over time, and update a pool of media available for recommendation to include the first media element when it exceeds the intensity threshold, wherein the intensity threshold is an average intensity level on an intensity scale of emotional feedback from the user, and wherein verification of the intensity threshold includes comparing an intensity peak in the first plot to the intensity threshold;
    wherein the processor is further configured to predict one or more personality traits of the user based on at least one selected from the group of the first and the second plot, and assign the one or more personality traits to a personality profile of the user; and
    wherein the processor is further configured to recommend media to the user based on a comparison of the one or more personality traits of the user with one or more personality traits assigned to a second personality profile of a second user.

2. The system of claim 1 further comprising:
    a software module configured to hypothesize a mood of the user based on a comparison of the first plot with the second plot, wherein the first plot is generated according to emotion intensity data measured by a biofeedback sensor.

3. The system of claim 2 wherein:
    the processor is further configured to update the mood hypothesis based on one or more differences in intensity between the first plot and the second plot.

4. The system of claim 1 wherein:
    the processor is further configured to generate or modify the first plot based on implicit emotion assignment, wherein implicit emotion assignment involves associating biofeedback with a hypothesized emotion.

5. The system of claim 1 wherein the processor is further configured to:
    compare personality traits of the personality profile of the user to personality traits of the second personality profile of the second user to determine if there are one or more like personality traits between the users;
    compare, when there are one or more like personality traits between the users, emotional reaction data that exceeds a threshold for all media experienced by both the user and the second user to determine if one or more same media elements elicited a strong emotional reaction in both users;
    predict that, when there are one or more like personality traits between the users, and the one or more same media elements elicited a strong emotional reaction in both users, the user and the second user will demonstrate a similar emotional reaction to subsequent media shared between the user and the second user; and
    recommend media to the user based on the prediction.

6. The system of claim 5 wherein:
    the processor is configured to compare the personality profiles of the user and the second user and recommend media to the user based on the comparison without comparing emotional intensity reaction plots between the user and the second user.

7. The system of claim 1 wherein:
    the processor is configured to recommend media elements to the user to improve the user's hypothesized mood.

8. The system of claim 7 wherein the processor is further configured to:
    adjust the mood hypothesis based on the user's emotional intensity reactions to subsequent media elements, wherein the user's emotional intensity reactions are measured by a biofeedback sensor; and
    wherein the processor is further configured to sequence media elements based on historic user data.

9. The system of claim 1 wherein:
the processor is further configured to permit the user and second user to, based on each's preferences for relationship forming, view one another's personality profiles, and the one or more personality traits assigned to each personality profile.

10. The system of claim 9 wherein:
the first and second personality profiles are dating profiles.

11. A system for recommending media based on feedback from a user, the system comprising:
a processor, configured with instructions to generate, based off of biofeedback data received from a sensor, a first plot demonstrating the user's emotional intensity reaction to the first media element over time, wherein the first plot is generated during or after each instance the user experiences a first media element;
wherein the processor is further configured with instructions to generate a second plot demonstrating the user's average emotional intensity reaction over time to the first media element;
wherein the processor is further configured with instructions to compare the first plot to the second plot and evaluate a difference therebetween;
wherein the processor is further configured to adjust a mood hypothesis based on (i) the difference between the first plot and the second plot, and (ii) a minimum time interval required between media replays to increase user emotional reaction intensity; and to apply the adjusted mood hypothesis to regulate at least one of media recommendations and personality profiling for the user;
wherein the processor is further configured to assign information from at least one selected from the group of the first plot and the second plot to a personality profile of the user.

12. The system of claim 11 wherein the processor is further configured to:
compare personality traits of the personality profile of the user to personality traits of a second personality profile of a second user to determine if there are one or more like personality traits between the users;
compare, when there are one or more like personality traits between the users, emotional reaction data that exceeds a threshold for all media experienced by both the user and the second user to determine if one or more same media elements elicited a strong emotional reaction in both users;
analyze one or more intensity peaks to evaluate emotional reaction data;
predict that, when there are one or more like personality traits between the users, and the one or more same media elements elicited a strong emotional reaction in both users, the user and the second user will demonstrate a similar emotional reaction to subsequent media shared between the user and the second user; and
recommend media to the user based on the prediction.

13. The system of claim 11 wherein:
the processor is configured to modify the mood hypothesis based on biofeedback sensor data.

14. The system of claim 11 wherein:
the first media element comprises at least one selected from the group of a song, other audio track, and video, and wherein the first media element is added to a playlist only when the sensor detects a significant emotional response in the biofeedback data.

15. A method for recommending media based on feedback from a user, the method comprising:
providing a processor, and configuring the processor with instructions to generate, during or after each instance the user experiences a first media element, a first plot demonstrating the user's emotional intensity reaction to the first media element over time;
configuring the processor with instructions to generate a second plot demonstrating the user's average emotional intensity reaction over time to the first media element;
configuring the processor with instructions to compare the first plot to the second plot, and to evaluate a difference therebetween;
configuring the processor to verify an intensity threshold of the user's emotional intensity reaction to the first media element over time, and update a pool of media available for recommendation to include the first media element when it exceeds the intensity threshold, wherein the intensity threshold is an average intensity level on an intensity scale of emotional feedback from the user, and wherein verification of the intensity threshold includes comparing an intensity peak in the first plot to the intensity threshold;
configuring the processor to predict one or more personality traits of the user based on at least one selected from the group of the first plot and the second plot, and assign the one or more personality traits to a personality profile of the user; and
configuring the processor to recommend media to the user based on a comparison of the one or more personality traits of the user with one or more personality traits assigned to a second personality profile of a second user.

16. The method of claim 15 further comprising:
providing a software module configured to hypothesize a mood of the user based on a comparison of the first plot with the second plot, wherein the first plot is generated according to emotion intensity data measured by a biofeedback sensor; and
configuring the processor to adjust the mood hypothesis based on one or more differences in intensity between the first plot and the second plot.

17. The method of claim 15 further comprising:
configuring the processor to generate the first plot based on implicit emotion assignment, wherein implicit emotion assignment involves associating biofeedback with a hypothesized emotion.

18. The method of claim 15 further comprising:
configuring the processor to allow the user and the second user to, based on each's preferences for relationship forming, view one another's personality profiles, and the one or more personality traits assigned to each personality profile.

19. The method of claim 15 further comprising configuring the processor to:
compare personality traits of the personality profile of the user to personality traits of the second personality profile of the second user to determine if there are one or more like personality traits between the users;
compare, when there are one or more like personality traits between the users, emotional reaction data that exceeds a threshold for all media experienced by both the user and the second user to determine if one or more same media elements elicited a strong emotional reaction in both users;
analyze one or more intensity peaks to evaluate emotional reaction data;

predict that, when there are one or more like personality traits between the users, and the one or more same media elements elicited a strong emotional reaction in both users, the user and the second user will demonstrate a similar emotional reaction to subsequent media shared between the user and the second user; and
recommend media to the user based on the prediction.

20. The method of claim 15 further comprising:
configuring the processor to recommend media elements to the user based on the user's hypothesized mood.

* * * * *